(12) United States Patent
Ishikawa et al.

(10) Patent No.: US 6,219,965 B1
(45) Date of Patent: *Apr. 24, 2001

(54) PLANT GROWTH SHEET STRUCTURE, NATURAL TURF SHEET STRUCTURE, METHOD OF GROWING TURF AND METHOD OF LAYING TURF SHEET STRUCTURE

(75) Inventors: Yoshio Ishikawa, Kishiwada; Hiroaki Fukumoto, Kitakatsuragi; Toshimasa Hirasawa, Tokyo; Tatsuo Hatado, Tokyo; Akira Taga, Tokyo; Kaoru Yamada, Tokyo, all of (JP)

(73) Assignees: Otsuka Kagaku Kabushiki Kaisha, Osaka; Maedakensetsukogyo Kabushiki Kaisha, Tokyo, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/615,247

(22) PCT Filed: Jul. 21, 1995

(86) PCT No.: PCT/JP95/01451

§ 371 Date: Jul. 15, 1997

§ 102(e) Date: Jul. 15, 1997

(87) PCT Pub. No.: WO96/03027

PCT Pub. Date: Feb. 8, 1997

(30) Foreign Application Priority Data

| Jul. 23, 1994 | (JP) | 6-192021 |
| Dec. 5, 1994 | (JP) | 6-300896 |
| Dec. 5, 1994 | (JP) | 6-300897 |

(51) Int. Cl.$^7$ .................................................. A01B 79/00
(52) U.S. Cl. ............................ 47/58.1; 47/1.01 T; 47/44; 428/85; 428/92; 428/95
(58) Field of Search ..................... 435/430, 410; 47/58.1, 1.01 T, 44; 428/85, 92, 95

(56) References Cited

FOREIGN PATENT DOCUMENTS

| 85/03842 | 9/1985 | (EP) . |
| 51-119108 | 10/1976 | (JP) . |
| 54-117732 | 9/1979 | (JP) . |
| 60-95004 | 5/1985 | (JP) . |
| 62-25907 | 2/1987 | (JP) . |
| 63-91015 | 4/1988 | (JP) . |
| 2-104216 | 4/1990 | (JP) . |
| 3-247204 | 11/1991 | (JP) . |
| 3-262405 | 11/1991 | (JP) . |
| 4-9553 | 1/1992 | (JP) . |

*Primary Examiner*—Leon B. Lankford, Jr.
(74) *Attorney, Agent, or Firm*—Arent Fox Kintner Plotkin & Kahn

(57) ABSTRACT

This invention provides a plant growth sheet structure which includes a base web layer and a core layer integrally coupled together in this order, a base web layer, a plant seed holding layer and a core layer integrally coupled together in this order, or a base web layer, a core layer, a plant seed holding layer and a cover web layer integrally coupled together in this order, and is provided at its surface with plant protection projections, and also provides a natural turf sheet structure including a natural turf grown on the plant growth sheet structure. This invention also provides a turf growing method in which a semi-artificial turf sheet structure including an artificial turf portion and a natural turf portion is laid over a concrete wall surface for performing hydroponics of the natural turf portion, and also provides a method of laying a turf sheet structure, in which a similar semi-artificial sheet structure is accommodated in an outdoor accommodating place for growing a natural turf portion, and is transferred to and laid in large-scale facilities on demand.

34 Claims, 9 Drawing Sheets

PLANT GROWTH SHEET STRUCTURE, NATURAL TURF SHEET STRUCTURE, METHOD OF GROWING TURF AND METHOD OF LAYING TURF SHEET STRUCTURE

TECHNICAL FIELD

The present invention relates to a plant growth sheet structure which can be laid in grounds such as a general house garden, a bank of a river, a park and a golf course as well as planting zones of various buildings, roads or the like, fields of various sport facilities and others, and is used for growing plants. The present invention also relates to a natural turf sheet structure which is obtained from the above structure and has a natural turf grown on it.

Also, the present invention relates to a method of growing turfs on concrete walls of a dam, a retention pond or the like.

Further, the present invention relates to a method of laying a turf sheet structure, and in particular to a method of laying the turf sheet structure at large-scale facilities.

BACKGROUND ART

When one intends to grow natural turfs, grasses or flowers at a ground such as a general house garden, a bank of a river, a park or a golf course, or a planting zone of a building, road or the like, he or she directly sows plant seeds in the ground or planting zone, or plants young plants therein. An appropriate anti-flow-out fence or the like may be provided for preventing flow-out of the sowed seeds or planted young plants as well as applied fertilizer by rain, wind and irrigated water.

In the sport facilities, fields of soil or natural turfs have been used for a long time. However, a difficult or laborious work is required for maintaining such fields, so that artificial turfs are now used in many cases.

However, the artificial turf is not suitable to some kinds of sports such as a soccer, so that such sports are played on the natural turf even in these days.

In the sport facilities, however, the field in which the natural turf is directly planted in the ground suffers from such problems that it is difficult to control the growth of the turf, and that a long time is required for repairing a turf damaged by the play, which may disable continuous use thereof. In view of this, such a method may be used that natural turfs which have been grown at another place are laid on a leveled and prepared base ground, and a possible damaged portion can be replaced with a new turf.

Natural turfs which have been grown at a different place and are cut into an appropriate size are used for laying them in the sport facilities and for replacing a damaged turf portion with it, as is well known. In connection with this, one can envisage a semi-artificial natural turf sheet structure which does not use natural soil and can be transferred.

Such a turf sheet structure may be used at grounds such as a general house garden, a bank of a river, a park, a golf course, a hillock and a seaside as well as planting zones of various buildings, roads or the like.

As an example of a semi-artificial natural turf sheet structure, Japanese Laid-Open Patent publication No. 51-119108 (1976) has disclosed a turf mat which can be rolled up and includes a turf growing soil layer made of saw-dust, an underlying mesh mat and a water-proof base sheet in a layered fashion. Also, Japanese Laid-Open Patent publication No. 54-117732 (1979) has disclosed a turf sheet in which soil or sand is laid on a net, and a turf is grown on the same. Japanese Laid-Open Patent publication No. 60-95004 (1985) has disclosed a structure, in which a rubber mat or a synthetic resin plate provided with holes are laid in a place for growing a natural turf, and the holes are filled with soil, sand, turf runners, fertilizer and water retaining material for growing the turf. Japanese Laid-Open Patent publication No. 62-25907 (1987) has disclosed a mat which is mainly made of a rock wool holding turf seeds mixed thereinto. Japanese Laid-Open Patent publication No. 63-91015 (1988) has disclosed a planting mat, in which a rock wool is integrally provided with a frame member having substantially equally spaced tip ends and a bottom in a matrix form, and turf seeds are contained in the rock wool. Japanese Laid-Open Patent publication No. 2-104216 (1990) has disclosed a long-sheet product in a roll form, in which turfs are decomposed and expanded into elongated forms, stripe-shaped runners are arranged on a net having an appropriate mesh size, and their top surfaces are covered with a water-soluble paper sheet. Japanese Laid-Open Patent publication No. 3-247204 (1991) has disclosed the following natural turf base. A turf growing base member is made of a mixture of fertilizer and an inorganic light-weight soil member. Side and lower surfaces of the base member are covered with a lower sheet. An upper sheet is arranged on an upper surface of the base member. A member holding turf seeds are arranged at the lower surface of the upper sheet. A wave-shaped net is arranged between the turf seed holding member and the lower sheet and in the base member. The upper and lower sheets are integrally joined together by sewing threads, staples or the like.

However, when one intends to grow natural turfs, grasses or flowers at a ground such as a general house garden, a bank of a river, a park, a golf course, a hillock washed with rainwater, or a seaside exposed to a strong wind, or at a planting zone of a building, road or the like by directly sowing plant seeds in the ground or planting zone, or planting young plants therein, such a problem arises that the sowed seeds or planted young plants as well as applied fertilizer and others are liable to be flown out by rainwater, wind, irrigated water and others. Although the above problem can be prevented by provision of an anti-flow-out fence, or the like, this requires a laborious and time-consuming work.

Each of the natural turf sheet structures disclosed in the foregoing publications can be used without cutting it or after cutting it into an appropriate size. Further, it may be cut into an appropriate size after germination of turf seeds or growth, if necessary. Thereby, it can be laid over grounds such as a general house garden, a bank of a river, a park and a golf course as well as a place such as a planting zone of a building or a road, in which case the foregoing problems caused by direct sowing in the soil can be prevented to a certain extent. Also, the above structures can be used in sport facilities. However, the following problem arises.

The perforated rubber mat and synthetic resin plate disclosed in Japanese Laid-Open Patent publication No. 60-95004 are used not for entirely growing the turf but for intermittently growing the turf. Therefore, this cannot be employed when the turf is to be grown on a whole surface without a space. Particularly, this cannot be employed in sport facilities.

Further, except for the natural turf base, which includes the upper and lower sheets fixed together by the sewing threads, staples or the like as disclosed in Japanese Laid-Open Patent publication No. 3-247204, the structures disclosed in the foregoing publications cannot be used for the places such as sport facilities in which a severe force is applied thereto, because these structures are liable to be entirely decomposed and/or damaged. If the turf is damaged, e.g., by being shaved, an underlying material is exposed to exhibit an unpreferable appearance.

Even in the natural turf base disclosed in Japanese Laid-Open Patent publication No. 3-247204, if the turf is damaged, e.g., by being shaved, an underlying material is exposed, which similarly results in an unpreferable appearance.

Further, any of the natural turf sheet structures disclosed in the foregoing publications suffers from a problem that its weight is small and/or it cannot be sufficiently fitted with the underlying soil or the like, resulting in a poor stability. Therefore, a problem arises when it is laid, for example, over an inclined surface of a river bank, hillock or the like. Particularly, it is not suitable to the sport facilities, because players cannot stably play on the structure.

Description has been given on the case where the plants such as a turf are grown in grounds such as a general house garden, a bank of a river, a park and a golf course as well as planting zones of various buildings, roads or the like, fields of various sport facilities and others. In addition to these places, it is preferable to plant the natural turf at concrete walls of concrete constructions such as a concrete dam in some cases in order to protect the construction and/or improve an appearance.

Generally, dams are used for irrigation and water control, and more specifically, for storing water for electric power generation, irrigation, public water, industrial water or the like, and/or for preventing flood or controlling a water level. As a kind of dam, there has been a concrete dam constructed from concrete.

Generally, outer surfaces or walls of the concrete dam are not finished or coated. However, the unfinished concrete surface is directly exposed to the sunshine, wind and rain, so that they are liable to be deteriorated. In order to prevent the deterioration, outer finishing may be effected on the concrete surface as is done in ordinary buildings. However, the concrete dam, which is a huge construction, requires a vast sum of money for finishing its outer surfaces, so that the outer surfaces are not actually finished.

Some of huge dams are tourist attractions, in which case unfinished concrete surfaces of the dams present an unpreferable scene and sense of incompatibility with respect to surrounding green.

As measures for the above, it may be envisaged to cover the concrete surfaces, e.g., of the concrete dam with a natural turf sheet. However, appropriate method and technique for the above have not been proposed.

In addition to the foregoing, the following problem actually arises when one intends to lay turfs or the like.

In many large-scale facilities such as indoor sport facilities, gymnasiums and other multipurpose holes, an artificial turf is laid and removed depending on contents of the games and events. In this case, a problem actually arises in connection with storage of huge artificial turfs, which are to be laid in large-scale facilities. For example, if a warehouse for storing the artificial turfs cannot be ensured in the large-scale facilities, the warehouse must be independently prepared for storing them. If the independent warehouse is remote from the large-scale facilities, a time-consuming work is required for transferring the artificial turfs between the warehouse and the large-scale facilities. Further, the artificial turf is worn in accordance with use, and is considerably damaged when it is used for hard sport games such as a soccer. Therefore, the artificial turf requires a time-consuming repair.

Accordingly, a first object of the invention is to provide a plant growth sheet structure of a first type for growing a plant such as a turf which has the following advantages.

(1-1) Without changing a size or after cutting the structure into an appropriate size, the structure can be simply and easily laid in grounds such as a general house garden, a park, a river bank, a golf course, a hillock washed with rainwater and a seaside exposed to a strong wind as well as planting zones of various kinds of buildings, roads or the like, sport facilities and others. Also, it is possible to sow seeds of turfs, grasses and flowers, and grow them in the structure. Also, the structure can be moved to and from the above places.

(1-2) Sowed seeds, sprouts growing therefrom and others are suppressed from being moved and flowed out by the wind, rain, irrigated water or the like, which facilitates growth and maintenance of the plants.

(1-3) The whole structure is integral and has a sufficient resistance against decomposition. Sowed seeds as well as sprouts, roots and others are protected against a downward load, a lateral pulling force or the like, which also facilitates maintenance of growing and grown plants.

(1-4) It is possible to suppress an unpreferable appearance before growing of plants and even in such a case that grown plants are damaged or lost due to shaving or withering.

(1-5) The structure can be laid over possible seeds of weeds to restrict growth thereof, which also facilitates maintenance of growing and grown plants.

(1-6) A weight can be controlled, and thus its weight can be reduced to allow easy transfer. Also, the weight can be increased to improve stability of the laid structure at an installation place. The stability of the laid structure can be improved to allow use in sport facilities for some kinds of sports.

(1-7) The structure can be produced in an elongated form.

A second object of the invention is to provide a plant growth sheet structure of a second type, which holds seeds of plant such as turf seeds in advance, and has the following advantages.

The "turf seeds" mean the seeds of turf themselves as well as runners or the like which are obtained from cut turfs or the like, and from which a turf can be obtained.

(2-1) Without changing the size, or after cutting the structure into an appropriate size, the structure can be easily laid in grounds such as a general house garden, a river bank, a park, a golf course, a hillock washed with rainwater, and a seaside exposed to a strong wind as well as planting zones of various buildings, roads or the like, sport facilities and others. It is possible to grow plants from seeds of turf, grass or flower which are held in advance at the structure. Also, the structure can be moved to and from the above places.

(2-2) The plant seeds held at the structure, sprouting therefrom and others are suppressed from being moved or flowed out by the wind, rain, irrigated water or the like, which facilitates growth and maintenance of plants.

(2-3) The whole structure is integral and has a sufficient resistance against decomposition. Held seeds as well as sprouts, roots and others are protected against a downward load, a lateral pulling force or the like, which also facilitates maintenance of growing and grown plants.

(2-4) The structure also has advantages similar to those already described at the items (1-4) through (1-7) of the plant growth sheet structure of the first type.

A third object of the invention is to provide a natural turf sheet structure having the following advantages.

(3-1) Without changing the size, or after cutting the structure into an appropriate size, the structure can be easily laid in grounds such as a general house garden, a park, a river bank, a golf course, a hillock and a seaside as well as planting zones of various buildings, roads or the like, sport facilities and others. Also, the structure can be easily moved to and from the above places.

(3-2) The turf is suppressed from being moved or flowed out by the wind, rain, irrigated water or the like, which facilitates growth and maintenance of turfs.

(3-3) The whole structure is integral and has a sufficient resistance against decomposition. Sprouts, roots and others of the turf are protected against a downward load, a lateral pulling force or the like. Therefore, the structure can be used in the sport facilities. This also facilitates maintenance of the turf.

(3-4) As compared with a conventional natural turf sheet structure, it is possible to suppress an unpreferable appearance in such a case that turfs are damaged or lost due to shaving or withering.

(3-5) The structure can be laid over possible seeds of weeds to restrict growth thereof, which also facilitates maintenance of turfs.

(3-6) A weight can be controlled, and thus its weight can be reduced to allow easy transfer. Also, the weight can be increased to improve stability of the laid structure at an installation place. The stability of the laid structure can be improved to allow use in sport facilities for some kinds of sports.

(3-7) The structure can be produced in an elongated form.

A fourth object of the invention is to provide a method of growing a turf, in which a turf is grown at a concrete surface of a concrete dam, a retention pond or the like for covering the concrete surface with a natural turf so as to protect the surface against the direct sunshine, wind and rain, and to improve an appearance thereof.

A fifth object of the invention is to provide a method of laying a turf sheet structure, and in particular to a method of laying a turf sheet structure in large-scale facilities, by which it is possible to perform storage of the turf sheet structure before and after intended arrangement of the same, laying of the stored structure for the intended arrangement, and restoring and rearranging of the damaged turf sheet structure in a more simple and economical manner than a conventional artificial turf.

DISCLOSURE OF THE INVENTION

A plant growth sheet structure for growing a plant such as a turf according to the invention for achieving the first object (i.e., the plant growth sheet structure of the first type) is characterized in that a base web layer and a core layer are layered in this order along an ascending direction and are integrally coupled together; the base web layer has a water retentivity; and the core layer has a large number of gaps providing water and gas permeabilities, has a form-maintaining property, and is provided at its surface with a large number of flexible plant protection projections.

A plant growth sheet structure for growing a plant such as a turf according to the invention for achieving the second object (i.e., the plant growth sheet structure of the second type) may be either of the following plant growth sheet structures of two types, i.e., type 2(1) and types 2(2).

The plant growth sheet structure of the type 2(1)

The plant growth sheet structure for growing a plant such as a turf is characterized in that a base web layer, a plant seed holding layer for holding and germinating plant seeds such as turf seeds, and a core layer are layered in this order along an ascending direction and are integrally coupled together; the base web layer has a water retentivity; and the core layer has a large number of gaps providing water and gas permeabilities, has a form-maintaining property, and is provided at its surface with a large number of flexible plant protection projections.

The plant growth sheet structure of the type 2(2)

The plant growth sheet structure for growing a plant such as a turf is characterized in that a base web layer, a core layer, a plant seed holding layer for holding and germinating plant seeds such as turf seeds, and a cover web layer allowing growth of plants from the plant seeds are layered in this order along an ascending direction and are integrally coupled together; the base web layer has a water retentivity; the core layer has a large number of gaps providing water and gas permeabilities, and has a form-maintaining property; and the cover web layer is provided at its surface with a large number of flexible plant protection projections.

A natural turf sheet structure according to the invention for achieving the third object may be one of the following structures.

A natural turf sheet structure (i.e., natural turf sheet structure of a 1L type) which is obtained from the plant growth sheet structure of the type 1 already described and has a natural turf grown from turf seeds sowed in it.

A natural turf sheet structure (i.e., natural turf sheet structure of a 2(1)L type) which is obtained from the plant growth sheet structure of the type 2(1) already described and has a natural turf grown from turf seeds held as plant seeds in it.

A natural turf sheet structure (i.e., natural turf sheet structure of a 2(2)L type) which is obtained from the plant growth sheet structure of the type 2(2) already described and has a natural turf grown from turf seeds held as plant seeds in it.

In any of the structures, the "turf seeds" mean the seeds of turf themselves as well as runners or the like which are obtained from cut turfs or the like, and from which a turf can be obtained.

In any of the plant growth sheet structures and the natural turf sheet structures described above, the base web layer employed therein is essentially required only to have the water retentivity, which allows absorption of water, which is, for example, applied or poured to the structure, or in which the structure is immersed. By controlling the water retentivity, the weights of the plant growth sheet structure and the natural turf sheet structure of the invention can be controlled. Also, by controlling the water retentivity, it is possible to control an amount of water supplied to seeds, sprouts and grown plants, e.g., of a natural turf. Further, by adding nutrient into the water retained therein, it is possible to control an amount of nutrient to be supplied. The amount of retained water can be desirably controlled not only by controlling an amount of water supplied to the structure but also by discharging the water by compressing, squeezing or tilting the structure. In any case, it is desired to provide a flexibility at the base web layer so as to improve a fitting property of the plant growth sheet structure and the natural sheet structure of the invention with respect to a place for installation.

For example, the base web layer may be a web layer formed of an appropriate kind of entangled fibers (e.g., cotton fibers), a fabric of an appropriate kind of fibers, a knit or a combination of them.

Among them, the cotton web layer is desirable because it has a good water absorption and a good water retentivity, and allows easy discharging of water, e.g., by compressing or squeezing the same so that the weight can be controlled easily. Also, it allows easy controll of the amount of retained water so that the amount of water supplied to seeds, sprouts and grown plants of the natural turf or the like can be controlled easily. Further, by preparing the water containing nutrient, it allows easy control of the amount of nutrient to be supplied.

When the base web layer is a cotton web layer, it may be made of natural cotton, synthetic fiber cotton or combination of them. In order to allow control of the water retentivity in a wide rage, the cotton may be entirely or partially a water-absorbing cotton made of water-absorbing fibers. For example, the layer may be made of mixture of synthetic fiber cotton and water-absorbing cotton. For example, this synthetic fiber cotton may be made of polyester or acrylic fibers of about 2 to 8 deniers. For example, the water-absorbing cotton may be made of super-water-absorbing fibers (trade name: Runseal F) manufactured by Toyo Bouseki Co. Ltd.

In any of the plant growth sheet structures and the natural turf sheet structures already described, the core layer employed therein is essentially required only to have gaps, e.g., in a continuous form providing water and gas permeabilities in order to allow sufficient germination of the plant seeds and subsequent growth, and to have a form-maintaining property. Further, the core layer is desired to ensure an intended strength of the plant growth sheet structure or the natural turf sheet structure. For example, it may be a have a mesh form, and specifically, may be a three-dimensional mesh structure formed of entangled synthetic resin fibers, a mesh basket structure formed of synthetic resin fibers, a series of small mesh basket structures, a single mesh plate made of synthetic resin fibers or the like, or a plurality of layered mesh plates formed of synthetic resin fibers. It may also be formed of the above mesh core layer loaded with bulk material, saw-dust, wood pieces or the like, or a mesh or cloth bags accommodating bulk material, saw-dust, wood pieces or the like. In any case, it is desirable that the core layer has a flexibility so as to improve a fitting property of the plant growth sheet structure or natural turf sheet structure with respect to an installation place. Additionally, it is desirable that the core layer has an appropriate elasticity for improving a feeling of an athlete or player who walks or plays on the structure (particularly, in the case of the natural turf sheet structure).

The three-dimensional mesh structure formed of entangled synthetic resin fibers is desirable because it has an appropriate flexibility and an appropriate elasticity as well as a large number of gaps and an appropriate strength. Particularly, the three-dimensional mesh structure may be preferably formed of entangled synthetic resin fibers of about 0.1 mm to about 0.8 mm in diameter made of, e.g., polyamide, polypropylene or polyvinyl chloride.

The foregoing three-dimensional mesh structure may be a mesh structure (e.g., trade name: Zeomat 7020) manufactured by Zeon Chemical Co., Ltd.

In any case, at least the surface of the core layer may be colored, for example, similarly to the color of a plant (e.g., green, or mixed stripes of brown and green) so as to prevent remarkable impairment of an appearance by the core layer in such cases that, in the plant growth sheet structure of the above type 1, plants have not yet grown from sowed seeds or grown plants are shaved off or wither, that, in the plant growth sheet structure of the above type 2(1), plants have not yet grown from seeds in the plant seed holding layer or grown plants are shaved off or wither, and that a turf on the natural turf sheet structure of the invention obtained from the above plant growth sheet structure is shaved off or withers.

In the plant growth sheet structures of the above type 2 (type 2(1) and 2(2)), the plant seed holding layer is essentially required only to hold the plant seeds such as turf seeds without allowing movement thereof so as to allow germination, and it is desired that the plant seeds are dispersed as uniformly as possible. For example, this plant seed holding layer may include a non-woven fabric sheet allowing germination of plant seeds and subsequent growth, the plant seeds uniformly dispersed on the non-woven fabric sheet, and a water-soluble seed retaining film covering the plant seeds without preventing germination of the plant seeds and the subsequent growth. The water-soluble film retaining seeds may be made of a protein material, a starch material or the like, and may contain germination nutrient. Alternatively, the plant seed holding layer may include a base sheet, e.g., made of a non-woven fabric sheet and dispersed plant seeds adhered to the base sheet by adhesive. In any case, it is desired that it has a flexibility as a whole so as to provide a good fitting or mating property with respect to the core layer and base web layer (in the case of type 2(1)), or the core layer and the cover web layer (in the case of type 2(2)). The non-woven fabric sheet and the base sheet may have a water resistance or a water-solubility, and may also have another property.

The cover web layer in each of the plant growth sheet structure of the type 2(2) and the natural turf sheet structure obtained therefrom are essentially required to have the following features. In the plant growth sheet structure, it is required to allow germination of the plant seeds at the plant seed holding layer and subsequent growth, and is desirably required to protect the plant seeds. In the natural turf sheet structure, it is required to allow growth or the like of plants, and is also desirable to provide a water retentivity. Further, it is desired to allow control of the amount of retained water. In view of the above, the web may be, for example, a layer made of cotton, a fabric of various kinds of fibers, a knit or a combination of them. Among them, the cotton web layer is one of the desirable webs because it has good water-absorbing and retaining properties and allows easy control of the amounts of water and nutrient to be supplied. In the case where the cotton web layer is employed, the cotton may be natural cotton, synthetic fiber cotton or combination of them, and, similarly to the base web layer, may be partially or entirely formed of water-absorbing cotton made of water-absorbing fibers (e.g., foregoing Runseal F).

In the plant growth sheet structure of the type 2(2), the base web layer and the cover web layer may be made of cotton web layers, in which case a quantity of cotton of the cover web layer may be smaller than that of the base web layer to form the cover web layer thinner than the base web layer, so that the cover web layer may not impede germination of the plant seeds and subsequent growth. Meanwhile, the base web layer is desired to have a thickness which allows control of the quantity of retained water, and thereby allows control of the weight of the base web layer and the quantity of water supplied to plants in an intended range.

The base web layer and the cover web layer may be mutually coupled by threads or the like. In connection with this, the base web layer and the cover web layer made of cotton may be coupled together by mutually entangling and coupling some of cotton fibers forming these layers through the core layer and the plant seed holding layer. Coupling of these cotton webs may be performed by a needle punch method, which is known as a general web joining method, with the core layer and the plant seed holding layer arranged therebetween. In addition to the above manner, threads or another coupling means may be employed.

In the plant growth sheet structure of the type 1 and the plant growth sheet structure of the type 2(1) as well as the natural turf sheet structures obtained therefrom, the base web layer and the core layer may be mutually coupled by threads or another means. In connection with this, if the base web layer is made of cotton, both the layers may be coupled together by entangling some of the cotton fibers forming the base web layer with the core layer, and threads or another coupling means may be additionally employed.

In any of the plant growth sheet structures and natural turf sheet structures described above, a backing member may be arranged at the lower portion of the web layer for one or more of purposes of protection of the base web layer, shape-maintaining, control of a cushioning property of the structure, control of a weight of the structure and others. The backing member which has a sheet form may be adhered to the lower surface of the base web layer, may be laid over and coupled to the base web layer by a coupling means such as threads, or may be arranged by combination of the above manners. Alternatively, the backing member may be molded into a sheet-like form at the lower portion of the base web layer. Another manner may also be employed, and, for example, a backing material may be applied to the lower surface of the base web layer.

The backing member is arranged to allow water flow between the base web layer and its exterior, if the plant growth sheet structure and the natural turf sheet structure of the invention are of a permanent type and thus are permanently arranged at places. If they are of a temporary type and thus may be transferred, it may be unnecessary to allow the water flow. Whichever type it may be, the backing member may be arranged to allow water flow between the base web layer and its exterior in order to allow utilization of moisture or water in the soil or the like at which the structure of the invention is arranged, to improve drainage of the structure, to discharge surplus moisture or water from the structure and/or to achieve another effect. In this case, the backing member itself may or may not have a water permeability. Even if the backing member does not have a water permeability, a plurality of backing members may be arranged intermittently, so that water flow is allowed between the base web layer and its exterior.

In any case, the backing member arranged at the base web layer partially or entirely may be made of a water-soluble material containing fertilizer. In this case, external supply of nutrient can be reduced or eliminated depending on the amount and kind of the fertilizer, so that it is possible to reduce the maintenance work.

In the plant growth sheet structure of the above type 1 and the natural turf sheet structure of the invention obtained therefrom as well as the plant growth sheet structure of the above type 2(1) and the natural turf sheet structure of the invention obtained therefrom, the core layer is provided at its surface with a large number of flexible plant protection projections. In the plant growth sheet structure of the above type 2(2) and the natural turf sheet structure of the invention obtained therefrom, the cover web layer is provided at the surface with flexible plant protection projections. The protection projection may be formed of a fiber member, which is provided for forming the protection projection and is made of synthetic resin, natural material, combination thereof and other materials. The fiber member may be attached to the surface of the core layer or cover web layer by adhesion, binding or weaving. Alternatively, the fiber member for forming the protection projection may be woven through the core layer into the base web layer, or through the cover web layer into the base web layer. In this manner, the fiber member forms the plant protection projection at the surface of the core layer or the cover web layer. In this case, the fiber member can contribute by itself or together with another connecting means such as threads to integral coupling between the base web layer and the core layer, integral coupling of the base web layer, core layer and plant seed holding layer located therebetween, or integral coupling of the base web layer, core layer, plant seed holding layer and cover web layer.

In the structure where the fiber member for forming the plant protection projection is woven through the core layer into the base web layer so that the fiber member forms the plant protection projection at the surface of the core layer, or in the structure where the fiber member for forming the plant protection projection is woven through the cover web layer into the base web layer so that the fiber member forms the plant protection projection at the surface of the cover web layer, the backing member may be used also as a member which acts at least partially on a portion of the fiber member woven into the base web layer for preventing disengagement. In this structure, the backing member may not be merely fitted onto the base web layer, but may be adhered to the lower surface of the base web layer, or may be molded into a sheet-like form at the lower portion of the base web layer, or may be formed by applying a backing material to the lower surface of the base web layer for fixing the fiber member, i.e., for disengagement. The backing member may be provided for one or more of the above purposes such as protection of the base web layer, shape maintaining, control of a cushioning property of the structure, control of the structure weight and others, and as described above additionally for the purpose of prevention of disengagement of the fiber member. However, the major purpose of the backing member may be only prevention of disengagement of the fiber member, although it may additionally achieve one or more of protection of the base web layer, shape maintaining, control of a cushioning property of the structure, control of the structure weight and others.

In any case, pile yarns may be employed as the fiber members for forming the plant protection projections, and in this case the protection projection may be formed of, for example, a pile projection such as a cut pile or a loop pile of a carpet, or may be formed of a pile-like projection, e.g., formed by a chain stitch.

Regardless of whether the fiber members are made of the pile yarns or not, the plant protection projections formed at the surfaces of the core layer and the cover web layer are essentially required only to have a strength (e.g., tensile strength), a toughness or the like which allow protection of the sowed plant seeds or the plant seeds held at the plant seed holding layer, sprouts and roots growing from the seeds, and grown plants. The fiber member may be formed of a single fiber, a bundle of a plurality of fibers, a plurality of twisted monofilaments or the like. For example, it may be a large-denier filament yarn, e.g., of polyamide, polyethylene or polyester.

In any case, the fiber member for forming the plant protection projection may have a water transferring property regardless of whether it is a pile yarn or not. Employment of the fiber member having the water transferring property facilitates maintenance such as growth of plants. Typically, the fiber member having the water transferring property can be selected from various kinds of fiber members having the water transferring property achieved by a capillary phenomenon. It may be a twisted monofilament disclosed in the international publication WO90/15193 based on the international patent application under P.C.T., which has a spiral section and has a good water retentivity and a good water transferring property for an artificial turf.

In any case, a height of the plant protection projection from the surface of the core layer or the cover web layer is determined to allow the grown plant to project above the protection projection, and in view of protection of the seeds, roots or the like of the plants. For example, if the plant is a turf, the height may be about 3 mm to about 15 mm, and preferably about 5 mm to about 7 mm, although it is not restricted to these values. The density of the plant protection projections at the surfaces of the core layer or the cover web layer is determined in an appropriate range which allows protection of the seeds, roots and others of the plants, and does not impede growth of the plants.

In any case, the protection projections may be colored, for example, similarly to the color of a plant (e.g., green, or mixed stripes of brown and green) so as to prevent remarkable impairment of an appearance by the plant protection projections in such cases that, in the plant growth sheet structure, plants have not yet grown or grown plants are shaved off or wither, and that, in the natural turf sheet structure, the turf is shaved off or withers.

In the plant growth sheet structure and the natural turf sheet structure of the invention, the base web layer, the core layer, the plant seed holding layer (if provided) and the cover web layer (if provided) may be flexible to allow rolling or winding of the entire structure for facilitating transfer and storage.

The plant growth sheet structure of the type 1 achieving the above first object and the natural turf sheet structure obtained therefrom as well as the plant growth sheet structures of the type 2 (types 2(1) and 2(2)) achieving the above second object and the natural turf sheet structure obtained therefrom can be easily laid on grounds such as a general house garden, a park, a river bank, a golf course, a hillock, and a seaside as well as planting zones of various buildings, roads and others, sport facilities, another place and facilities dedicated for growing the natural turf sheet structure or the like from the plant growth sheet structure. If necessary, the structures are transferred to and from the above places.

In the plant growth sheet structure of the type 1, plant seeds of a turf, grass, flower or the like are sowed, and water containing or not containing plant growing nutrient is supplied thereto under an appropriate temperature condition, so that the base web layer absorbs and retains the water, and the seeds germinate and grow to intended plants.

In the plant growth sheet structure of the type 2, water containing or not containing plant growing nutrient is supplied thereto under an appropriate temperature condition, so that the base web layer absorbs and retains the water, and the seeds held in advance at the structure germinate and grow to intended plants.

In any of the natural turf sheet structure of the invention, water containing or not containing plant growing nutrient is supplied thereto, so that the base web layer absorbs and retains the water, and the turf is maintained and grows.

If a plurality of structures, each of which is the same as the plant growth sheet structures or the natural turf sheet structures and has an appropriate size, are arranged in an aligned form, adjacent structures are mutually coupled, e.g., by machine-sewing the base web layers, if necessary. This coupling improves the installation stability of the structures. When a plurality of structures of an appropriate size are arranged in contact with each other (particularly, when the base web layers are arranged in contact with each other), the water containing or not containing growth nutrient may be partially supplied to them, in which case the base web layers function as water passages, so that the water (and nutrient) are uniformly and entirely supplied to them, which further facilitates the maintenance of plants. Roots of the grown plants may reach the base web layers to absorb therefrom the water (and nutrient in the water).

In the plant growth sheet structure of the type 1, the sowed seeds are located between the plant protection projections at the surface of the core layer, or are located in the core layer, and the seeds thus located hardly move therefrom, and are stably held thereat. Therefore, the sprouts and roots growing from the seeds are substantially held stably at the same positions, so that the sowed seeds as well as the sprouts and roots growing therefrom are suppressed from being moved and flowed by the wind, rain, irrigated water and others. In the natural turf sheet structure obtained from the above structure, the turf roots extend between the protection projections and further into the core layer, so that the turf is suppressed from being moved and flowed out by the wind, rain, irrigated water and others.

In the plant growth sheet structures of the type 2 provided with the plant seed holding layer, the plant seeds are stably held at the plant seed holding layer, and the sprouts and roots growing from the seeds are substantially held stably at the same positions. Therefore, the seeds as well as the sprouts and roots growing therefrom are suppressed from being moved and flowed by the wind, rain, irrigated water and others. In the natural turf sheet structure obtained from the structure of the type 2(1), the turf roots extend through the core layer and the base web layer and further between the protection projections, so that the turf is suppressed from being moved and flowed out by the wind, rain, irrigated water and others. In the natural turf sheet structure obtained from the structure of the type 2(2), the roots of the grown turf extend through the core layer and further reach the base web layer, so that the turf is suppressed from being moved and flowed out by the wind, rain, irrigated water and others.

In any of the plant growth sheet structure and the natural turf sheet structure of the invention, the whole structure is integral, and is suppressed from being decomposed by an external force. Further, the plant protection projections are arranged at the surface of the core layer or the cover web layer. In the plant growth sheet structure, therefore, the sowed seeds of plants or the plant seeds held in advance at the plant seed holding layer as well as the sprouts and roots growing therefrom are protected against a downward load, a lateral pulling load and others applied from a position above the protection projections. Also in the natural turf sheet structure, the sprouts and roots of the turf are protected against a downward load, a lateral pulling load and others. In particular, the plant growth sheet structure of the type 2(2) provided with the cover web layer and the natural turf sheet structure obtained therefrom are suitably used in places such as sport facilities in which a severe external force is applied thereto.

The plant protection projections arranged at the surfaces of the core layer and the cover web layer as well as the surfaces of the core layer and the cover web layer may be colored appropriately, so that it is possible, in the plant growth sheet structure, to prevent impairment of an appearance even in such a case that plants have not yet grown from the sowed or held seeds, or grown plants are damaged or lost due to shaving, withering or the like, and it is possible, in the natural turf sheet structure, to prevent impairment of an appearance even in such a case that the turf is damaged or lost due to shaving, withering or the like.

In any of the plant growth sheet structure and the natural turf sheet structure of the invention, the base web layer may be laid to press down possible seeds of weeds under the same, so that growth of unpreferable weeds can be prevented by laying the base web layer in this manner.

In any of the plant growth sheet structure and the natural turf sheet structure of the invention, the whole weight of the structure can be controlled by controlling, e.g., the amount of water supplied to the base web layer and thereby controlling the amount of water retained therein. By this weight control, the whole weight can be reduced for facilitating transfer of the structure. It is also possible to improve the installation stability of the structure at the intended place. Although depending on the kind of sport, it is possible to achieve the installation stability to allow use at sport facilities.

In any of the plant growth sheet structure and the natural turf sheet structure, it is possible to produce the structure in an elongated form.

A turf growing method of the invention achieving the fourth object is characterized in that a semi-artificial turf sheet structure including an artificial turf portion and a natural turf portion is laid. over a concrete wall surface, and hydroponics of the natural turf portion is performed by supplying water with or without nutrient to the semi-artificial turf sheet structure.

The above semi-artificial turf sheet structure is essentially required only to include the artificial turf portion and the natural turf portion. For example, the foregoing plant growth sheet structure of the type 2 and the natural turf sheet structure obtained therefrom may be employed as the foregoing semi-artificial turf sheet structure or a semi-artificial turf sheet structure piece. In this case, the plant protection projection in the structure can be used as the artificial turf portion, and the turf seeds held at the plant seed holding layer and the natural turf growing therefrom can be used as the natural turf portion.

More specifically, the following structures may be examples of the semi-artificial turf sheet structure.

(α) The semi-artificial turf sheet structure is formed of a plurality of plant growth sheet structures, each of which corresponds to the plant growth sheet structure of the type 2(1), and has such features that a base web layer, a plant seed holding layer for holding and germinating turf seeds, and a core layer are layered in this order along an ascending direction and integrally coupled together, that the base web layer has a water retentivity, and that the core layer has a large number of gaps providing water and gas permeabilities, has a form-maintaining property, and is provided at its surface with a large number of flexible plant protection projections. Alternatively, the semi-artificial turf sheet structure is formed of a plurality of natural turf sheet structures, each of which includes the turf grown from the above plant growth sheet structure and corresponds to the natural turf sheet structure of the type 2(1)L.

(β) The semi-artificial turf sheet structure is formed of a plurality of plant growth sheet structures, each of which corresponds to the plant growth sheet structure of the type 2(2), and has such features that a base web layer, a core layer, a plant seed holding layer for holding and germinating turf seeds, and a cover web layer are layered in this order along an ascending direction and are integrally coupled together, that the base web layer has a water retentivity, that the core layer has a large number of gaps providing water and gas permeabilities, and has a form-maintaining property, and that the cover web layer is provided at its surface with a large number of flexible plant protection projections. Alternatively, the semi-artificial turf sheet structure is formed of a plurality of natural turf sheet structures, each of which includes the turf grown from the above plant growth sheet structure and corresponds to the natural turf sheet structure of the type 2(2)L.

The foregoing concrete wall surface may be, for example, a concrete wall surface of a dam, a retention pond or the like.

According to the turf growing method of the invention, the semi-artificial turf sheet structure including the artificial turf portion and the natural turf portion is laid over the concrete wall surface, and the water with or without the nutrient is supplied to the turf sheet structure thus laid, so that hydroponics can be performed at the natural turf portion, and thereby a natural turf can be laid over the concrete wall surface. Since the concrete wall surface is covered with the turf sheet structure and thus is not directly exposed to the sunshine, wind and rain, deterioration of the concrete wall surface can be prevented. The concrete wall surface can be easily greened.

If the concrete wall surface is a surface of a dam, water stored in the dam can be supplied to the laid semi-artificial turf sheet structure together with nutrient, if necessary, so that growth of the natural turf portion can be performed easily.

As described above, the concrete wall of the concrete dam can be greened to improve a landscape by harmonizing the same with a surrounding green. Owing to this greening, the concrete dam can be utilized as one of sights in a sight-seeing route.

In the structure where water stored in the dam is supplied to the semi-artificial turf sheet, pipings may be arranged at the concrete wall surface to be covered with the turf sheet structure so that water may be supplied to the structure through sprinklers provided at the pipings. Alternatively, a runner or mobile unit which is movable on the concrete surface and stores water may be arranged for supplying water from the runner.

If the concrete wall surface is a concrete wall surface of a retention pond, water stored in the retention pond can be supplied to the semi-artificial turf sheet structure together with nutrient, if necessary, so that growth of the natural turf portion can be performed easily.

If the retention pond and its surrounding area are to be utilized as a place for recreation, the turf sheet structure covering the concrete wall surface of the retention pond provides a place suitable to recreation.

A method of laying a turf sheet structure for achieving the fifth object of the invention is characterized in that a semi-artificial turf sheet structure including an artificial turf sheet portion and a natural turf sheet portion is laid and kept at an outdoor accommodating place located outside large-scale facilities while growing a turf, the turf sheet structure is transferred to and laid in the large-scale facilities on demand, and when the semi-artificial turf sheet structure laid in the large-scale facilities is to be removed, the turf sheet structure is moved by transferring the same to the outdoor accommodating place outside the large-scale facilities and laying the same in the outdoor accommodating place.

The semi-artificial turf sheet structure is essentially required only to include the artificial turf portion and the natural turf portion, and the plant growth sheet structures of the type 2 already described and the natural turf sheet structures obtained therefrom may be employed as the semi-artificial turf sheet structure or the semi-artificial turf sheet structure piece in this method. In this case, the plant protection projections at either of these structures can be used as the artificial turf portion, and the seeds held at the plant seed holding layer and the natural turf growing therefrom can be used as the natural turf portion.

The semi-artificial turf sheet structure in this method may be selectively formed of the plant growth sheet structure of the above items ($\alpha$) and ($\beta$) as well as the natural turf sheet structures including the turf growing at these plant growth sheet structures.

In the method of laying the turf sheet structure according to the invention, the semi-artificial turf sheet structure may be formed of a plurality of semi-artificial turf sheet structure pieces.

In any cases, the outdoor accommodating place may be an outer wall and/or a roof of the large-scale facilities, and also may be an outer wall and/or a roof of a building neighboring to the large-scale facilities.

According to the method of laying the turf sheet structure of the invention, the turf sheet structure, which is formed of the semi-artificial turf sheet structure including the artificial turf portion and the natural turf portion, is accommodated at the outdoor accommodating place outside the large-scale facilities for growing the turf. Therefore, the method does not require a warehouse for accommodating and storing the turf sheet structure, and the semi-artificial turf sheet structure can be easily accommodated at the large outdoor accomodating place while growing the natural turf portion. The semi-artificial turf sheet structure, in which the natural turf portion was damaged during use, can be restored by growing the natural turf during accommodation and storage so that it can be used again, although this depends on a degree of damage.

Since the semi-artificial turf sheet structure is laid in the outdoor accommodating place, surroundings around the large-scale facilities can be greened by locating the outdoor accommodating place around the large-scale facilities.

Since the semi-artificial turf sheet structure is laid and accommodated at the outdoor accommodating place outside the large-scale facilities, the structure can be easily transferred to and laid in the large-scale facilities.

In the case where the semi-artificial turf sheet structure is formed of a plurality of semi-artificial turf sheet structure pieces, the turf sheet structure can be divided into pieces for laying and accommodating the same at the outdoor accommodating place, so that the structure can be laid and accommodated in accordance with a configuration of an installation area of the outdoor accommodating place.

The transfer of the semi-artificial turf sheet structure between the large-scale facilities and the outdoor accommodating place can be performed by transferring the divided pieces of the turf sheet structure, so that the semi-artificial turf sheet structure can be transferred easily even if it has a large area as a whole.

In the case where the outdoor accommodating place is defined by the outer wall of the large-scale facilities such as a balcony at the outer wall, the floor of the balcony can be greened by covering it with the semi-artificial turf sheet structure. Rainwater may be led to the balcony through gutters or the like for supplying it to the turf sheet structure. Alternatively, the balcony may be additionally provided with a water nozzle. In these manners, maintenance for growing the natural turf portion at the turf sheet structure can be performed easily.

In the case where the outdoor accommodating place is defined by a roof of the large-scale facilities, the semi-artificial turf sheet structure of a large area can be accommodated easily, and, owing to rainfall to the roof or water supplied from additionally provided water nozzles or the like, maintenance for growing the natural turf portion at the semi-artificial turf sheet structure can be performed easily.

In the case where the outdoor accommodating place is a place such as a balcony defined by the outer wall of the building neighboring to the large-scale facilities, maintenance for growing the natural turf portion at the semi-artificial turf sheet structure can be performed easily, similarly to the case of, e.g., the balcony defined by the outer wall of the large-scale facilities themselves.

In the case where the outdoor accommodating place is defined by a roof of the building neighboring to the large-scale facilities, the semi-artificial turf sheet structure of a large area can be accommodated easily, and, owing to rainfall to the roof or water supplied from additionally provided water nozzles, maintenance for growing the natural turf portion can be performed easily.

PREFERRED EMBODIMENTS OF THE INVENTION

Embodiments of the invention will now be described below with reference to the drawings.

Figure 1:
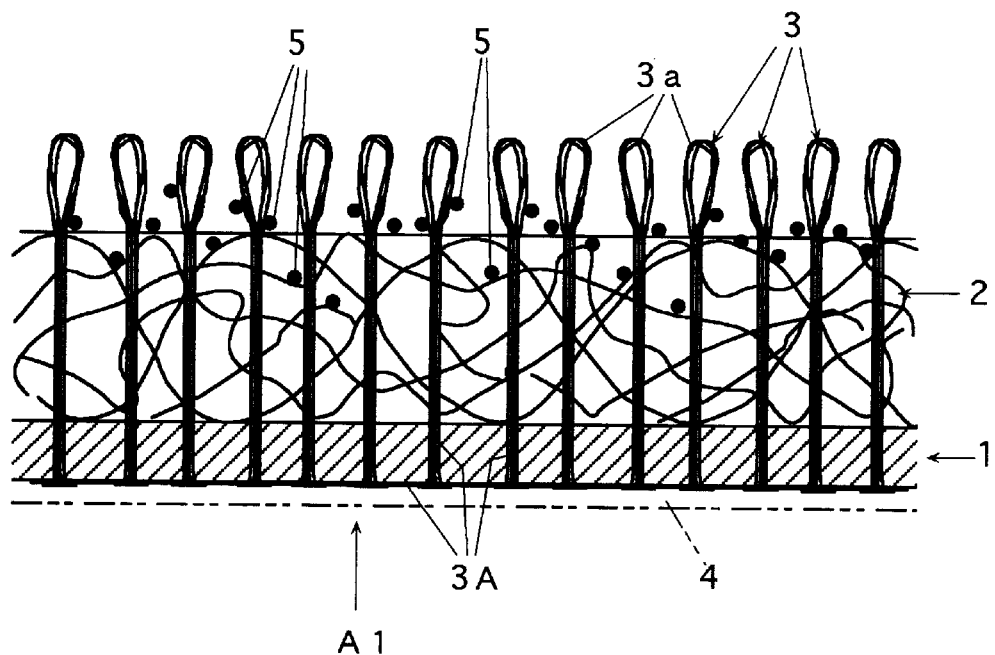
FIG. 1 is a schematic cross section showing an example of a plant growth sheet structure according to the invention together with turf seeds sowed therein.
Figure 2:
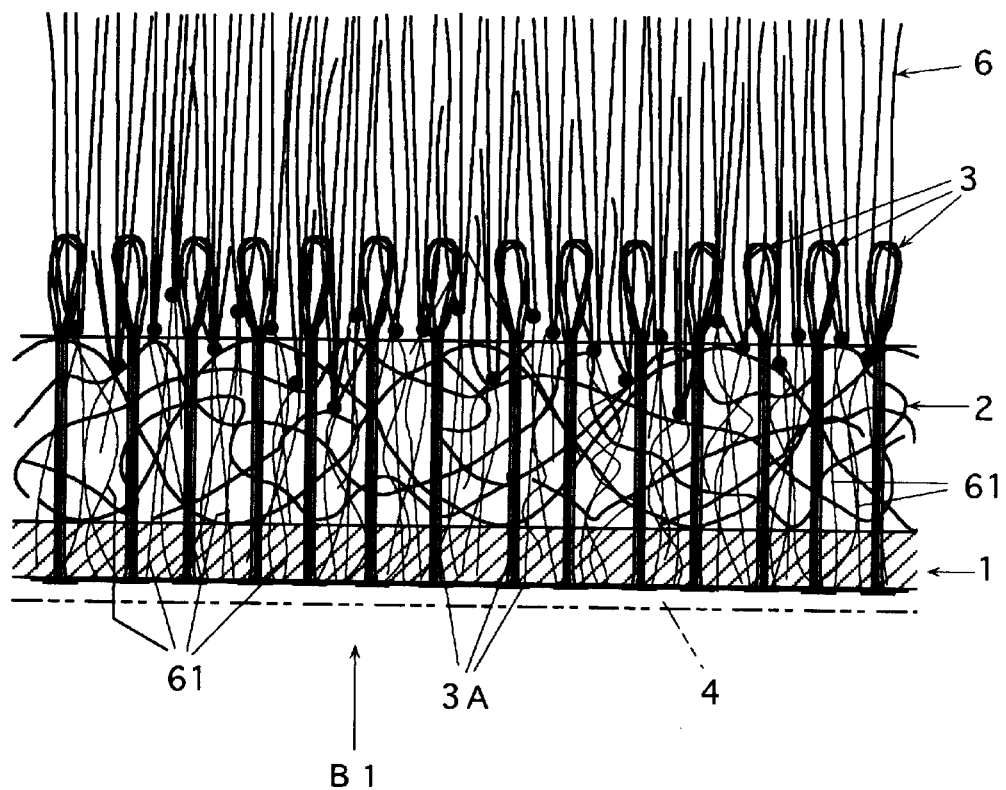
FIG. 2 is a schematic cross section of a natural turf sheet structure obtained from the plant growth sheet structure shown in FIG. 1.

FIG. 1 is a schematic cross section of an example A1 of a plant growth sheet structure according to the invention, and specifically shows a state that turf seeds are sowed. FIG. 2 is a schematic cross section of an example B1 of a natural turf sheet structure according to the invention. The natural turf sheet structure B1 shown in FIG. 2 is formed when the turf seeds grow at the plant growth sheet structure A1 shown in FIG. 1.

The plant growth sheet structure A1 shown in FIG. 1 includes a base web layer 1 and a core layer 2 which are layered in this order along an ascending direction, and is provided at a surface of the core layer 2 with a large number of flexible plant protection projections 3.

The base web layer 1 is a cotton web layer which is used at the rate of 300 g/m$^2$ and is formed of synthetic fiber cotton of 50% made of polyester fibers of 6 deniers and water-absorbing cotton of 50% made of water-absorbing acrylic fibers (Runseal F manufactured by Toyo Bouseki Co. Ltd.).

The core layer 2 is a three-dimensional mesh structure formed of entangled synthetic resin fibers, and is Zeomat 7020 manufactured by Zeon Co., Ltd. in this embodiment. More specifically, the core layer 2 is formed of entangled polyamide filaments of 0.5 mm in diameter, and is used at the rate of 420 g/m$^2$ and has a whole thickness of 20 mm. The core layer 2 has irregularities at its opposite surfaces, and also internally has continuous gaps, so that it has sufficient gas and water permeabilities. As a whole, it has a flexibility and an elasticity as well as a form-maintaining property and an appropriate strength. It allows easy loading of powder and particles such as sand.

Pile yarns 3A are woven through the core layer 2 into the base web layer 1, so that the base web layer 1 and the core layer 2 are integrally coupled to prevent decomposition.

The pile yarns 3A form a large number of loop piles 3a which are substantially uniformly dispersed and are projected from the surface of the core layer 2. The loop piles 3a form the flexible plant protection projections 3.

The pile yarn 3A is a polyamide bulky long fiber (generally called a"BCF nylon yarn") of 3000d/39f (d: denier, f: filament), and is formed of a mixture of green filaments and brown filaments so that it is colored similarly to the color of a natural turf. The pile yarns 3A have a water transferring property by a capillary phenomenon and are woven with 5/16 inch gage and 4 stitches. A height of the pile (plant protection projection) from the core layer 2 is about 5 mm to about 6 mm.

In this embodiment, a backing member is not arranged under the base web layer 1. However, if the piles 3a are cut-piles, a backing member 4 is applied to the lower surface of the base web layer 1 so as to prevent disengagement of the pile yarns 3A, as indicated by alternate long and two short dashes line. The backing member 4, if employed, may be formed by applying, in a thin form, a backing material having a water-nonsolubility and a gas permeability such as a mechanically foamed SBR latex, or by applying a water-soluble backing material such as polyvinyl alcohol or vinyl acetate resin emulsion. If the water-soluble backing material is to be used, at least a portion of the material may contain fertilizer.

The plant growth sheet structure A1 described above is formed from an elongated structure which was mass-produced in a factory. The elongated structure has a flexibility so that it can be rolled for storage and transfer. When used, it is cut into an appropriate size.

The structure A1 cut into an appropriate size is laid, for example, at a ground such as a general house garden, a park, a river bank, a golf course, a hillock or a seaside, at a planting zone of a building, road or the like, or at sport facilities. It may also be laid in a place or facilities dedicated to growth of the natural turf sheet structure B1 from the structure A1. This laying operation can be performed relatively easily. Also, the laid structure can be transferred.

Seeds such as turf seeds 5 are sowed in the plant growth sheet structure A1 laid in an intended place. The sowed turf seeds 5 are located between the plant protection projections 3 or in the core layer 2. In this state, water containing or not containing plant growing nutrient is supplied to the structure A1 under an appropriate temperature condition, so that the base web layer 1 absorbs and retains the water. Thereby, the turf seeds 5 germinate and grow into a turf 6 as shown in FIG. 2. At this stage, the structure A1 forms the natural turf sheet structure B1. The natural turf sheet structure B1 is also supplied with water with or without turf growing nutrient, which is absorbed into and retained at the base web layer 1. Thereby, the turf is maintained and grows.

Roots 61 of grown turf 6 reach base web layer 1, and are supplied therefrom with water with or without nutrient in solution.

The pile yarns 3A, which have water retaining and transferring properties and are woven through the core layer 2 into the base web layer 1, absorb water with or without nutrient. They also retain water with or without nutrient which is supplied from a higher position.

Even in a structure including the backing member 4, in the case where the member 4 is arranged to allow water flow between the base web layer 1 and the lower exterior, the base web layer 1 can absorb water in soil or the like over which the base web layer 1 is laid, and can also discharge surplus water into soil or the like. In the structure where the backing member 4 is made of a water-soluble material which partially or entirely contains fertilizer, the backing member is dissolved to supply nutrient in accordance with use of the structure. If the member 4 has a portion containing fertilizer, it is not essential to mix water to be supplied with nutrient, and external supply of nutrient can be eliminated.

If a plurality of structures each having an appropriate size and corresponding to either of the above structures, i.e., the plant growth sheet structure A1 or the natural turf sheet structure B1, are to be arranged, the adjacent structures can be integrally coupled, e.g., by machine-sewing portions of the base web layers 1, if necessary. This integration improves the installation stability, which is preferred in sport facilities or the like.

If a plurality of structures of an appropriate size are arranged in contact with each other, the base web layers 1 function as water passages to supply water with or without nutrient uniformly to the whole structures, even if the water with or without nutrient is supplied to only a portion of the whole structures.

In the plant growth sheet structure A1, the sewed turf seeds 5, which are located between the plant protection projections 3 at the surface of the core layer 2 or are located in the core layer 2, are substantially prevented from moving therefrom and are stably held at the same positions. Therefore, sprouts and roots growing from the seeds are held substantially stably at the same positions, and are prevented from being moved and flowed by the wind, rain, irrigated water and others. In the natural turf sheet structure B1, since the turf roots 61 extend between the plant protection projections 3 and, in many cases, into the core layer 2, the turf is prevented from being moved and flowed by the wind, rain, irrigated water and others. Accordingly, the plant growth sheet structure A1 is suitable to growth of plants at an inclined surface which is often washed with rainwater or irrigated water, a seaside exposed to a strong wind or places near these places. Also, the natural turf sheet structure B1 is suitable to maintenance and growth of natural turfs at an inclined surface which is often washed with rainwater or irrigated water, a seaside exposed to a strong wind or places near these places. In view of these points, maintenance of growing and grown turfs can be performed easily.

In either of the plant growth sheet structure A1 and the natural turf sheet structure B1, the pile yarn 3A is woven through the core layer 2 into the base web layer 1 for integrating the whole structure, so that the structure is sufficiently suppressed from being decomposed by an external force. Since the core layer 2 is provided at the surface with the plant protection projections 3, the protection projections 3 in the plant growth sheet structure A1 protect the sowed turf seeds 5, sprouts, roots 61 and others against a downward load, a lateral pulling load or the like. Also, the protection projections 3 in the natural sheet structure B1 protect the sprouts, roots 61 and others against a downward load, a lateral pulling load or the like. In this manner, damage by these loads is suppressed. Since the decomposition is suppressed and the protection projections 3 protect the turf roots and others, the structure can be used in sport facilities although this depends on the kinds of sports. Owing to the foregoing, the growth and maintenance of the turf can be performed easily.

The pile yarns 3A are colored similarly to the turf, and thus the plant protection projections 3 at the surface of the structure are similarly colored. Therefore, the plant growth sheet structure A1 does not exhibit an unpreferable appearance even before growth of the turf 6 from the sowed seeds 5, and even when the grown turf 6 is partially damaged or lost due to shaving, withering or the like. Also, the natural turf sheet structure B1 does not exhibit an unpreferable appearance even when the turf 6 is partially damaged or lost due to shaving, withering or the like, because the protection projections 3 colored similarly to the surrounding turf 6 appear at the damaged area.

In either of the plant growth sheet structure A1 and the natural turf sheet structure B1, the base web layer 1 which has increased its weight owing to retention of water and other portions can press possible seeds of weeds at an installation place, so that growth of the weeds is suppressed, and a time-consuming work for removing the weeds can be eliminated, which also facilitates growth and maintenance of the turf.

In either of the plant growth sheet structure A1 and the natural turf sheet structure B1, the base web layer 1 can absorb and retain the water supplied thereto, and also can be compressed to discharge the water, so that the quantity of retained water can be controlled easily. By this control of retained water, supply of water with or without nutrient can be controlled easily, so that the growth and maintenance of the turf can be performed easily.

Since the weight of the base web layer 1 can be controlled by controlling the quantity of retained water, this weight control can be performed for reducing the whole weight of the structure A1 or B1 so that the structure may be transferred easily. Alternatively, the weight can be increased to improve the installation stability of the structure at the installation place, so that the structure can achieve a sufficient installation stability even when it is installed at a place, e.g., in sport facilities where the structure receives a severe force from a player, although this depends on the kinds of sports.

Figure 3:
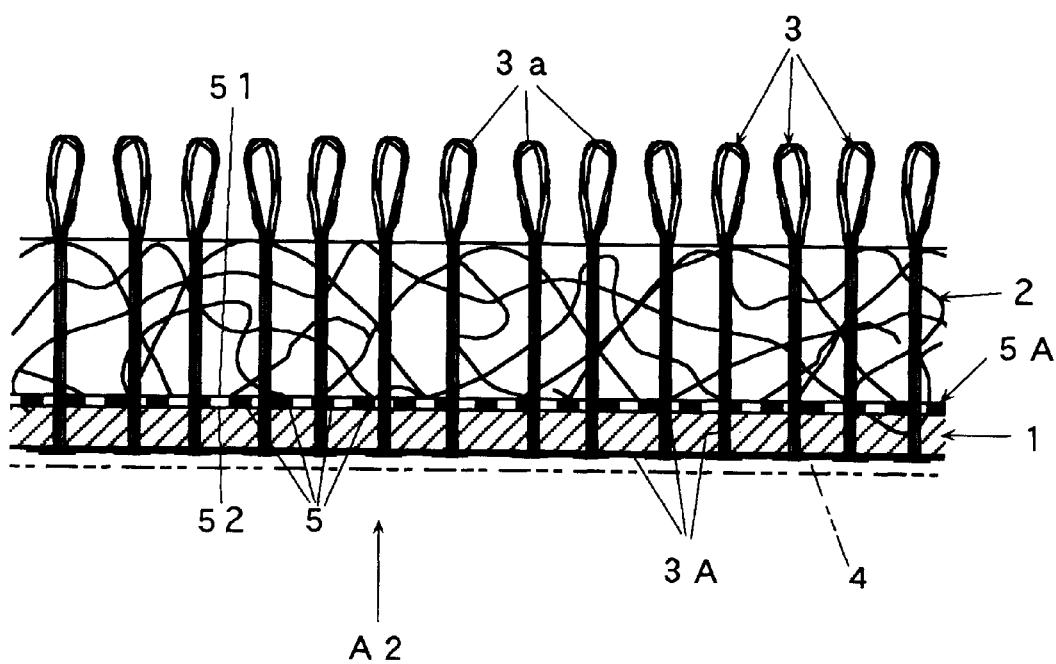
FIG. 3 is a schematic cross section showing another example of a plant growth sheet structure according to the invention.
Figure 4:
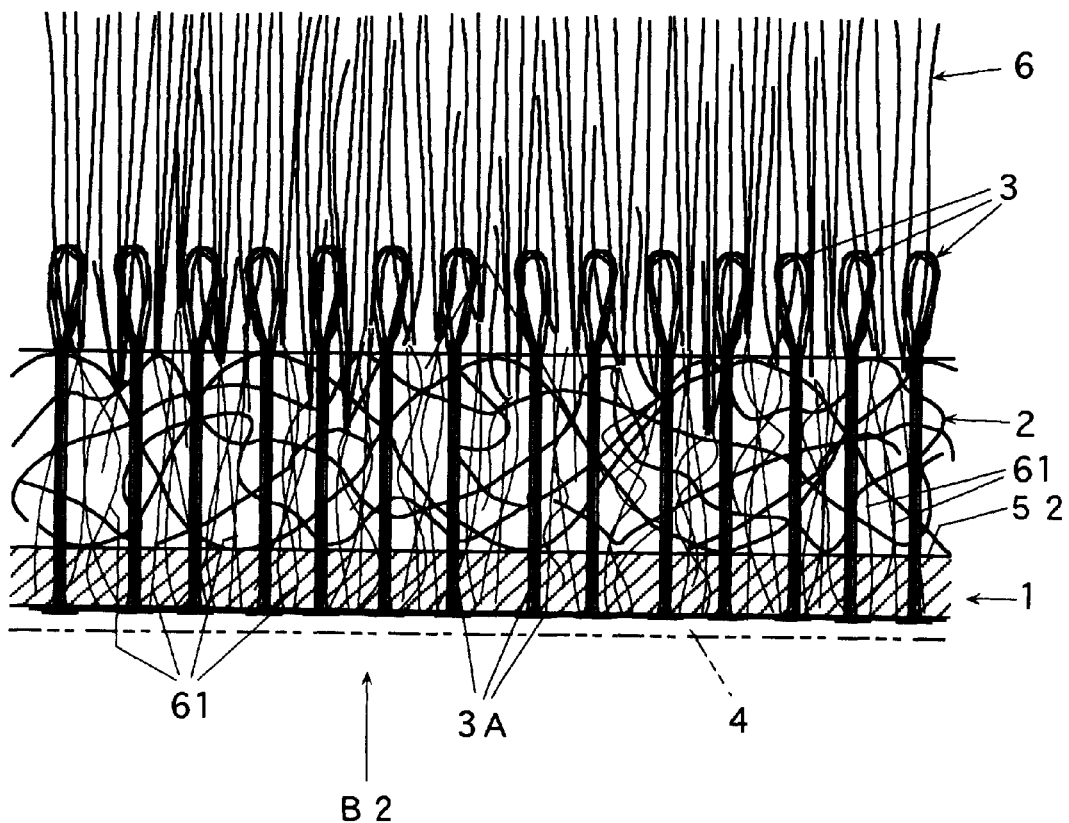
FIG. 4 is a schematic cross section of a natural turf sheet structure obtained from the plant growth sheet structure shown in FIG. 3.

FIG. 3 is a schematic cross section of another example A2 of a plant growth sheet structure according to the invention, and specifically shows a state in which turf seeds are held at the structure. FIG. 4 is a schematic cross section of another example B2 of a natural turf sheet structure according to the invention. The natural turf sheet structure B2 shown in FIG. 4 corresponds to the plant growth sheet structure A2 shown in FIG. 3 in which the turf seeds have germinated and grown.

The plant growth sheet structure A2 shown in FIG. 3 includes the base web layer 1, a plant seed holding layer 5A and the core layer 2, which are layered in this order along an ascending direction and are integrally coupled. The core layer 2 is provided at its surface with a large number of flexible protection projections 3.

The structure A2 is the same as the plant growth sheet structure A1 shown in FIG. 1 except for that the plant seed holding layer 5A is pinched between the base web layer 1 and the core layer 2. The same parts and portions as those in the structure A1 bear the same reference numbers.

The plant seed holding layer 5A includes a flexible thin non-woven fabric sheet 52 having a gas permeability on which the turf seeds 5 are uniformly dispersed, and a flexible turf seed retaining film 51 having a water-solubility and mainly made of a protein material is laminated over the sheet 52, so that germination of the turf seeds and subsequent growth are not impeded. The turf seeds 5 in this embodiment may be seeds of turf and also may be runners or the like obtained from cut turfs.

The pile yarns 3A are woven through the core layer 2 into the base web layer 1, so that the base web layer 1, plant seed holding layer 5A and core layer 2 are integrally coupled to prevent decomposition.

The pile yarns 3A form a large number of loop piles 3a which are substantially uniformly dispersed and projected from the surface of the core layer 2, so that the loop piles 3a form the flexible plant protection projections 3.

In this embodiment, a backing member is not arranged under the base web layer 1. However, if the piles 3a are cut-piles, the backing member 4 is applied to the lower surface of the base web layer 1 so as to prevent disengagement of the pile yarns 3A, as indicated by alternate long and two short dashes line in FIGS. 3 and 4. The specific substance and others of the backing member 4 may be the same as those of the backing member 4 already described in connection with the plant growth sheet structure A1.

The plant growth sheet structure A2 described above is formed from an elongated structure which was mass-produced in a factory. The elongated structure has a flexibility so that it can be rolled for storage and transfer. When used, it is cut into an appropriate size.

The structure A2 cut into an appropriate size is laid, for example, at a ground such as a general house garden, a park, a river bank, a golf course, a hillock or a seaside, at a planting zone of a building, road or the like, or at sport facilities. It may also be laid in a place or facilities dedicated to growth of the natural turf sheet structure B2 from the structure A2. This laying operation can be performed easily. Also, the laid structure can be transferred.

The plant growth sheet structure A2 laid in a predetermined place is supplied with water containing or not containing turf growing nutrient. The base web layer 1 absorbs and retains the water, so that the turf seeds 5 germinate and grow into the natural turf 6 as shown in FIG. 4. At this stage, the structure A2 forms the natural turf sheet structure B2. The natural turf sheet structure B2 is supplied with water containing or not containing turf growing nutrient, and the base web layer 1 absorbs and retains the water, so that the turf is maintained and newly grows.

The roots 61 of grown turf 6 extend to the base web layer 1 through the residual non-woven fabric sheet 52 in the plant seed holding layer 5A, so that they are supplied therefrom with water containing or not containing nutrient.

The pile yarns 3A, which have water retaining and transferring properties and are woven through the core layer 2 into the base web layer 1, absorb water with or without nutrient from the base web layer 1. They also retain water with or without nutrient which is supplied from a higher position.

Even in a structure including the backing member 4, in the case where the member 4 is arranged to allow water flow between the base web layer 1 and the lower exterior, the base web layer 1 can absorb water in soil or the like over which the layer 1 is laid, and can also discharge surplus water into soil or the like. In the structure where the backing member 4 is made of a water-soluble material which partially or entirely contains fertilizer, the backing member is dissolved to supply nutrient in accordance with use of the structure. If the member 4 has a portion containing fertilizer, it is not essential to mix water to be supplied with nutrient, and external supply of nutrient can be eliminated.

If a plurality of structures each having an appropriate size and corresponding to either of the above structures, i.e., the plant growth sheet structure A2 or the natural turf sheet structure B2, are to be arranged, the adjacent structures can be integrally coupled, e.g., by machine-sewing portions of the base web layers 1 or providing a planar fastener, if necessary. This integration improves the installation stability, which is preferred, e.g., in sport facilities.

If a plurality of structures of an appropriate size are arranged in contact with each other, the base web layers 1 function as water passages to supply water with or without nutrient uniformly to the whole structures, even if the water with or without nutrient is supplied to only a portion of the whole structures.

In the plant growth sheet structure A2, since the turf seeds 5 are located between the base web layer 1 and the core layer 2 which is provided at its surface with the plant protection projections 3, the turf seeds 5 are substantially prevented from moving therefrom and are stably held at the same positions, and sprouts and roots growing from the seeds are held substantially stably at the same positions, and are prevented from being moved and flowed by the wind, rain, irrigated water and others. In the natural turf sheet structure B2, since the turf roots 61 extend into the core layer 2 and the base web layer 1, and, in some cases, between the plant protection projections 3, the turf is prevented from being moved and flowed by the wind, rain, irrigated water and others. Accordingly, the plant growth sheet structure A2 is suitable to growth of plants at an inclined surface which is often washed with rainwater or irrigated water, a seaside exposed to a strong wind or places near these places. Also, the natural turf sheet structure B2 is suitable to maintenance and growth of natural turfs at an inclined surface which is often washed with rainwater or irrigated water, a seaside exposed to a strong wind or places near these places. In view of these points, maintenance of growing and grown turfs can be performed easily.

Either of the plant growth sheet structure A2 and the natural turf sheet structure B2 has an entirely integrated structure, so that the structure is sufficiently suppressed from being decomposed by an external force. Since the core layer 2 is provided at the surface with the plant protection projections 3, the core layer 2 and the protection projections 3 in the plant growth sheet structure A2 protect the turf seeds 5 at the plant seed holding layer 5A as well as sprouts, roots and others growing therefrom against a downward load, a lateral pulling load or the like. Also, in the natural turf sheet structure B2, the sprouts, roots 61 and others of the turf 6 are protected by the core layer 2 and the projections 3 against a downward load, a lateral pulling load or the like. Therefore, the structure can be used in sport facilities although this depends on the kinds of sports. Owing to the foregoing, the growth and maintenance of the turf can be performed easily.

The pile yarns 3A are colored similarly to the turf, and thus the plant protection projections 3 at the surface of the structure are similarly colored. Therefore, the plant growth sheet structure A2 does not exhibit an unpreferable appearance even before growth of the turf 6 from the held seeds 5, and even when the grown turf 6 is partially damaged or lost due to shaving, withering or the like. Also, the natural turf sheet structure B2 does not exhibit an unpreferable appearance even when the turf 6 is partially damaged or lost due to shaving, withering or the like, because the protection projections 3 colored similarly to the surrounding turf 6 appear at the damaged area.

In either of the plant growth sheet structure A2 and the natural turf sheet structure B2, the base web layer 1 which has increased its weight owing to retention of water and other portions can press possible seeds of weeds at an installation place, so that growth of the weeds is suppressed, and a time-consuming work for removing the weeds can be eliminated, which also facilitates growth and maintenance of the turf.

In either of the plant growth sheet structure A2 and the natural turf sheet structure B2, the base web layer 1 can absorb and retain the water supplied thereto, and also can be compressed to discharge the water, so that the quantity of retained water can be controlled easily. By this control of retained water, supply of water with or without nutrient can be controlled easily, so that the growth and maintenance of the turf can be performed easily.

Since the weight of the base web layer 1 can be controlled by controlling the quantity of retained water, this weight control can be performed for reducing the whole weight of the structure A2 or B2, so that the structure may be moved easily. Alternatively, the weight can be increased to improve the installation stability of the structure at the installation place, so that the structure can achieve a sufficient installation stability even when it is installed at a place, e.g., in sport facilities where the structure receives a severe force from a player, although this depends on the kinds of sports.

Figure 5:
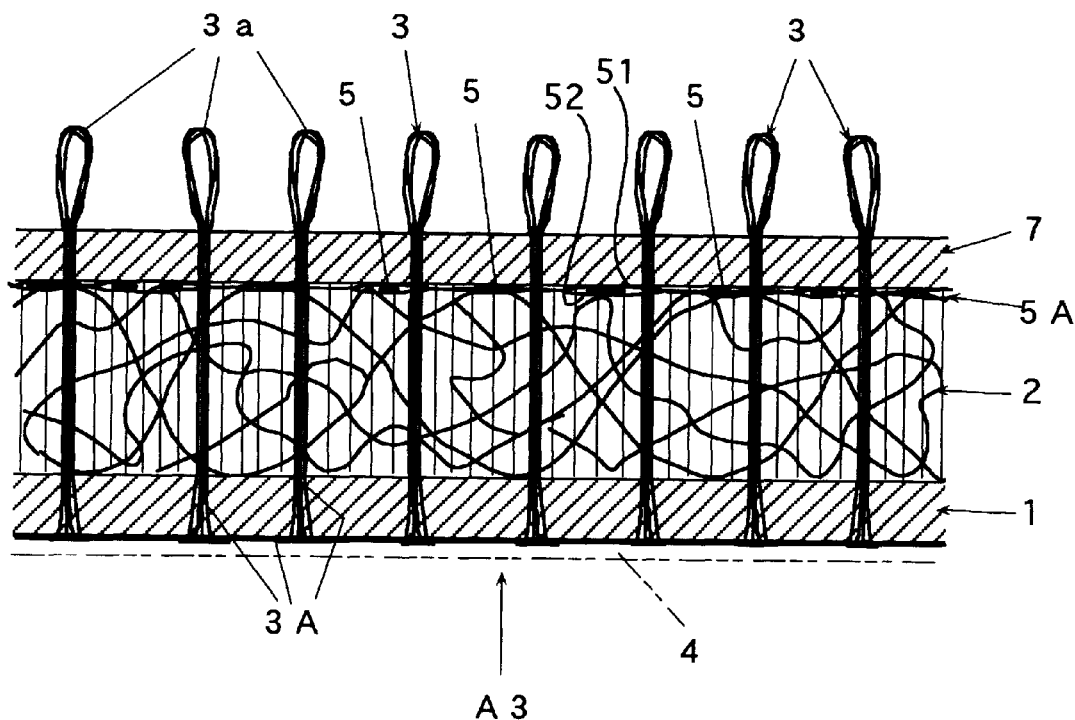
FIG. 5 is a schematic cross section of still another example of a plant growth sheet structure according to the invention.
Figure 6:
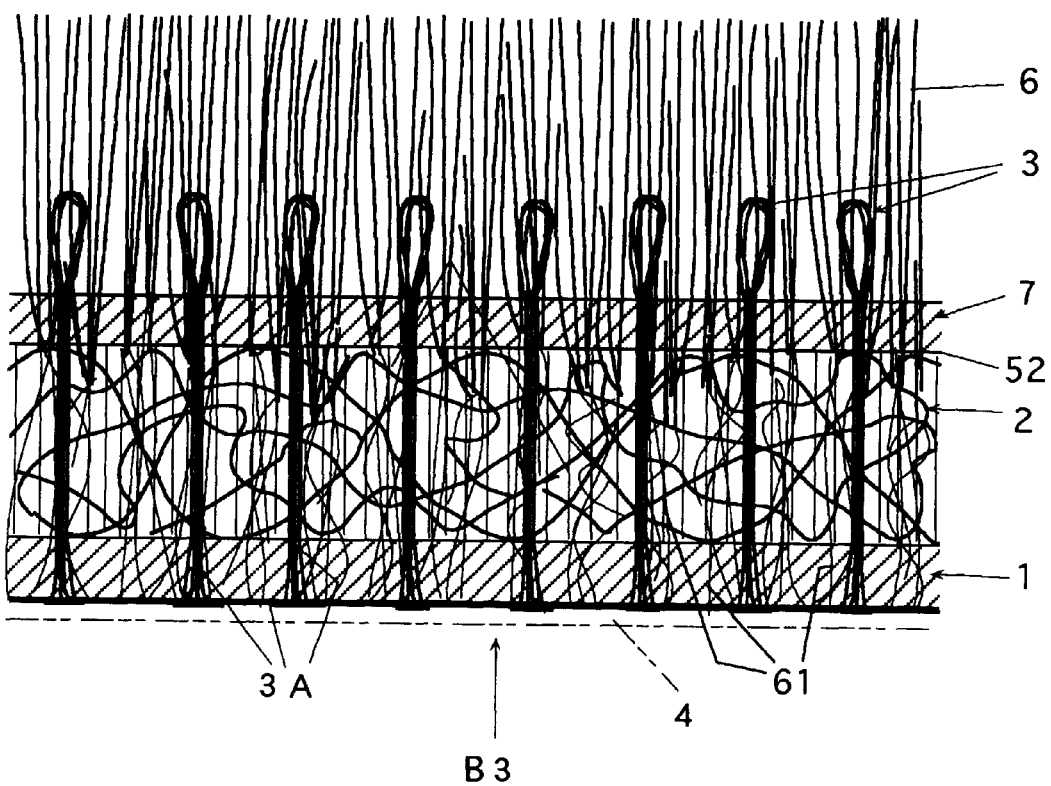
FIG. 6 is a schematic cross section of a natural turf sheet structure obtained from the plant growth sheet structure shown in FIG. 5.

FIG. 5 is a schematic cross section of still another example A3 of a plant growth sheet structure according to the invention, and specifically shows a state in which turf seeds are held at the structure. FIG. 6 is a schematic cross section of still another example B3 of a natural turf sheet structure according to the invention. The natural turf sheet structure B3 shown in FIG. 6 corresponds to the plant growth sheet structure A3 shown in FIG. 5 in which the turf seeds have germinated and grown.

As shown in FIG. 5, the plant growth sheet structure A3 includes the base web layer 1, core layer 2 and plant seed holding layer 5A as well as a cover web layer 7 which are layered in this order along an ascending direction. The pile yarns 3A are woven through the cover web layer 7 into the base web layer 1, and a large number of flexible plant protection projections 3 which are uniformly dispersed and are projected from the surface of the cover web layer 7.

The structure A3 is similar to the plant growth sheet structure A2 already described except for that the cover web layer 7 is arranged over the core layer 2, and the plant seed holding layer 5A is pinched between the cover web layer 7 and the core layer 2. The same or similar parts and portions as those in the structure A2 bear the same reference numbers.

The base web layer 1 is a cotton web layer which is used at the rate of 300 g/m$^2$ and is formed of synthetic fiber cotton of 50% made of polyester fibers of 6 deniers and water-absorbing cotton of 50% made of water-absorbing acrylic fibers (Runseal F manufactured by Toyo Bouseki Co. Ltd.). The cover web layer 7 is a cotton web layer which is used at the rate of 100 g/m$^2$ and is formed of a mixture of 50% synthetic fiber cotton and 50% water-absorbing cotton, similarly to the web layer 1.

The cotton web layers 1 and 7, between which the core layer 2 and the plant seed holding layer 5A are pinched, are mutually coupled by the needle punch method and specifically by needling with 50 times per square centimeter. Cotton fibers forming the web layers 1 and 7 are partially entangled through the core layer 2 and the plant seed holding layer 5A to couple them integrally.

The core layer 2 is a Zeomat 7020 manufactured by Zeon co., Ltd., and is the same as those of the core layers 2 in the plant growth sheet structures A1 and A2 already described. It is used at the rate of 420 g/cm$^2$ and has a whole thickness of 20 mm.

The plant seed holding layer 5A is the same as the plant seed holding layer 5A in the plant growth sheet structure A2 already described, and includes the non-woven fabric sheet 52 on which the turf seeds 5 are uniformly dispersed. The turf seed retaining film 51 is laminated over the sheet 52, so that germination of the turf seeds and subsequent growth are not impeded. The turf seeds 5 in this embodiment may be seeds of turf and also may be runners or the like obtained from cut turfs.

The pile yarn 3A has the same structure and substance as the pile yarns 3A in the plant growth sheet structures A1 and A2, and is a polyamide bulky long fiber (generally called a "BCF nylon yarn") of 3000d/39f (d: denier, f: filament). The pile yarns 3A are colored green, and are woven with 5/16 inch gage and 4 stitches. The pile yarns 3A thus woven form the loop piles 3a at the surface of the cover web layer 7, and the loop piles 3a form the flexible plant protection projections 3. A height of the pile (plant protection projection) formed at the surface of the cover web layer 7 is about 5 mm to about 6 mm. The pile yarn 3A may be colored similarly to that in the structure A2 by employing mixture of green filaments and brown filaments.

The pile yarns 3A thus woven and the cotton fibers connecting the web layers 1 and 7 together achieve the integral coupling which has a sufficient resistance against decomposition of the whole structure.

This embodiment does not include a backing member under the base web layer 1. However, if the piles 3a are cut-piles, the backing member 4 is applied to the lower surface of the base web layer 1 so as to prevent disengagement of the pile yarns 3A, as indicated in FIGS. 5 and 6 by alternate long and two short dashes line. The backing member 4, if employed, may be the same as that already described in connection with the plant growth sheet structure A1.

The plant growth sheet structure A3 described above is formed from an elongated structure which was mass-produced in a factory. The elongated structure has a flexibility so that it can be rolled for storage and transfer. When used, it is cut into an appropriate size.

The structure A3 cut into an appropriate size is laid, for example, at a ground such as a general house garden, a park, a river bank, a golf course, a hillock or a seaside, at a planting zone of a. building, road or the like, or at sport facilities. It may also be laid in a place or facilities dedicated to growth of the natural turf sheet structure B3 from the structure A3. This laying operation can be performed relatively easily. Also, the laid structure can be transferred.

The plant growth sheet structure A3 laid in a predetermined place is supplied with water containing or not containing plant growing nutrient, so that the base web layer 1 and cover web lay 7 absorb and retain the water. Thereby, the turf seeds 5 germinate and grow into a turf 6 as shown in FIG. 6. At this stage, the structure A3 forms the natural turf sheet structure B3. The natural turf sheet structure B3 is also supplied with water with or without turf growing nutrient, which is absorbed into and retained at the base web layer 1 and the cover web layer 7. Thereby, the turf is maintained and grows.

Roots 61 of grown turf 6 reach base web layer 1 through the residual non-woven fabric sheet 52 in the plant seed holding layer 5A and the core layer 2, and are supplied therefrom with water containing or not containing nutrient in solution.

The pile yarns 3A, which have water retaining and transferring properties and are woven through the cover web layer 7 into the base web layer 1, absorb water with or without nutrient from the base web layer 1. They also retain water with or without nutrient which is supplied from a higher position.

Even in a structure including the backing member 4, in the case where the member 4 is arranged to allow water flow between the base web layer 1 and the lower exterior, the base web layer 1 can absorb water in soil or the like over which the layer 1 is laid, and can also discharge surplus water into soil or the like. In the structure where the backing member 4 is made of a water-soluble material which partially or entirely contains fertilizer, the backing member is dissolved to supply nutrient in accordance with use of the structure. If the member 4 has a portion containing fertilizer, it is not essential to mix water to be supplied with nutrient, and external supply of nutrient can be eliminated.

If a plurality of structures each having an appropriate size and corresponding to either of the above structures, i.e., the plant growth sheet structure A3 or the natural turf sheet structure B3, are to be arranged, the adjacent structures can be integrally coupled, e.g., by machine-sewing portions of the base web layers 1 or providing a planar fastener, if necessary. This integration improves the installation stability, which is preferred, e.g., in sport facilities.

If a plurality of structures of an appropriate size are arranged in contact with each other, the base web layers 1 function as water passages to supply water with or without nutrient uniformly to the whole structures, even if the water with or without nutrient is supplied to only a portion of the whole structures.

In the plant growth sheet structure A3, since the turf seeds 5 are held at the plant seed holding layer 5 and are located between the core layer 2 and the cover web layer 7, the turf seeds 5 are substantially prevented from moving therefrom and are stably held at the same positions. Therefore, sprouts and roots growing from the seeds are held substantially stably at the same positions, and are prevented from being moved and flowed by the wind, rain, irrigated water and others. In the natural turf sheet structure B3, since the turf roots 61 extend into the core layer 2 and the base web layer 1, the turf is prevented from being moved and flowed by the wind, rain, irrigated water and others. Accordingly, the plant growth sheet structure A3 is suitable to growth of plants at an inclined surface which is often washed with rainwater or irrigated water, a seaside exposed to a strong wind or places near these places. Also, the natural turf sheet structure B3 is suitable to maintenance and growth of natural turfs at an inclined surface which is often washed with rainwater or irrigated water, a seaside exposed to a strong wind or places near these places. In view of these points, maintenance of growing and grown turfs can be performed easily.

Either of the plant growth sheet structure A3 and the natural turf sheet structure B3 has an entirely integrated structure, so that the structure is sufficiently suppressed from being decomposed by an external force. Since the cover web layer 7 is employed, and is provided at the surface with the plant protection projections 3, the cover web layer 7 and the protection projections 3 in the plant growth sheet structure A3 protect the turf seeds 5 at the plant seed holding layer 5A as well as sprouts, roots and others growing therefrom against a downward load, a lateral pulling load or the like. Also, in the natural turf sheet structure B3, the sprouts, roots 61 and others of the turf 6 are protected by the cover web layer 7 and the plant protection projections 3 against a downward load, a lateral pulling load or the like. Therefore, the structure can be used in sport facilities although this depends on the kinds of sports. Owing to the foregoing, the growth and maintenance of the turf can be performed easily.

The pile yarns 3A are colored similarly to the turf, and thus the plant protection projections 3 at the surface of the structure are similarly colored. Therefore, the plant growth sheet structure A3 does not exhibit an unpreferable appearance even before growth of the turf 6 from the held seeds 5, and even when the grown turf 6 is partially damaged or lost due to shaving, withering or the like. Also, the natural turf sheet structure B3 does not exhibit an unpreferable appearance even when the turf 6 is partially damaged or lost due to shaving, withering or the like, because the protection projections 3 colored similarly to the surrounding turf 6 appear at the damaged area.

In either of the plant growth sheet structure A3 and the natural turf sheet structure B3, the base web layer 1 which has increased its weight owing to retention of water and other portions can press possible seeds of weeds at an installation place, so that growth of the weeds is suppressed, and a time-consuming work for removing the weeds can be eliminated, which also facilitates growth and maintenance of the turf.

In either of the plant growth sheet structure A3 and the natural turf sheet structure B3, the base web layer 1 can absorb and retain the water supplied thereto, and also can be compressed to discharge the water, so that the quantity of retained water can be controlled easily. By this control of retained water, supply of water with or without nutrient can be controlled easily, so that the growth and maintenance of the turf can be performed easily.

Since the weight of the base web layer 1 can be controlled by controlling the quantity of retained water, this weight control can be performed for reducing the whole weight of the structure A3 or B3, so that the structure may be moved easily. Alternatively, the weight can be increased to improve the installation stability of the structure at the installation place, so that the structure can achieve a sufficient installation stability even when it is installed at a place, e.g., in sport facilities where the structure receives a severe force from a player, although this depends on the kinds of sports.

Then, an embodiment of a method of growing a turf according to the invention will be described below.

Figure 7:
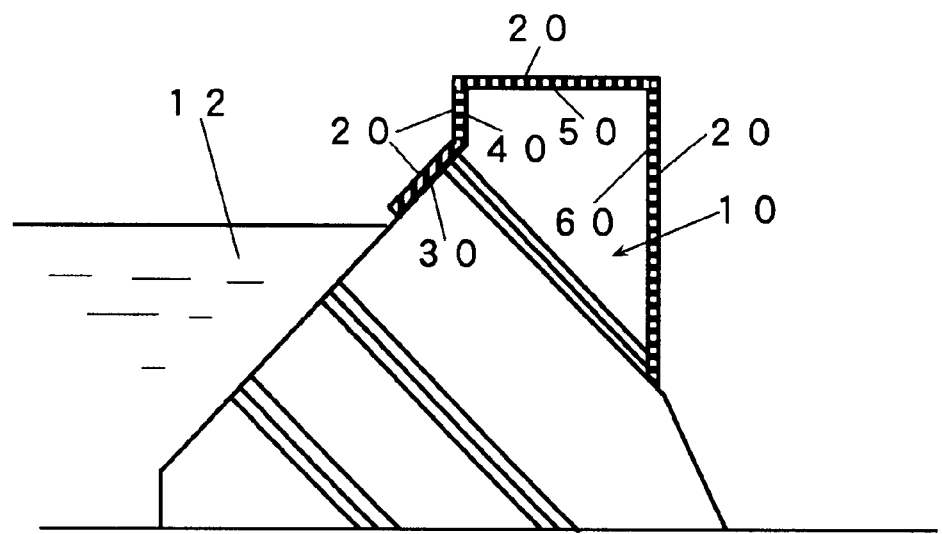
FIG. 7 is a cross section of a concrete dam for showing an example of a method of growing a turf according to the invention.

First, the embodiment of the method of growing the turf will be described below with reference to FIGS. 7 through 9. In this embodiment, a natural turf is grown at a wall surface of a concrete dam 10 with a semi-artificial turf sheet structure 20 (will be referred to as a "semi-artificial turf 20" hereafter).

The semi-artificial turf 20 is laid over each of an inclined wall surface 30 at rear side for storing water, a vertical wall surface 40 projecting vertically from an upper edge of the inclined wall surface 30, a horizontal wall surface 50 which extends perpendicularly from an upper edge of the vertical wall surface 40 and forms a top of the concrete dam 10, and a front wall surface 60 at the front side of the concrete dam 10.

Figure 8:
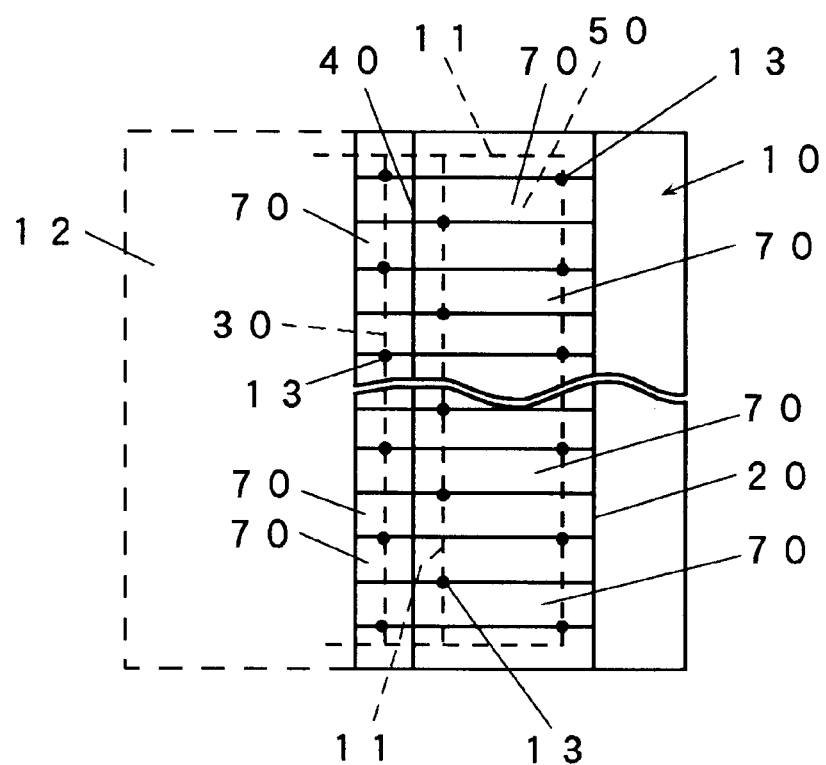
FIG. 8 is a plan of the dam shown in FIG. 7.

The semi-artificial turf 20 is formed of a plurality of semi-artificial turf sheet structure pieces 70 (which will be referred to as "semi-artificial turf pieces" hereafter), as shown in FIG. 8, which are arranged over the walls surfaces 30, 40 and 50 without any gap, and are joined together. The front wall surface 60 is also covered, except for a water discharge port and its lower portion, with the semi-artificial turf 20 formed of the semi-artificial turf pieces 70 joined together.

Figure 9:
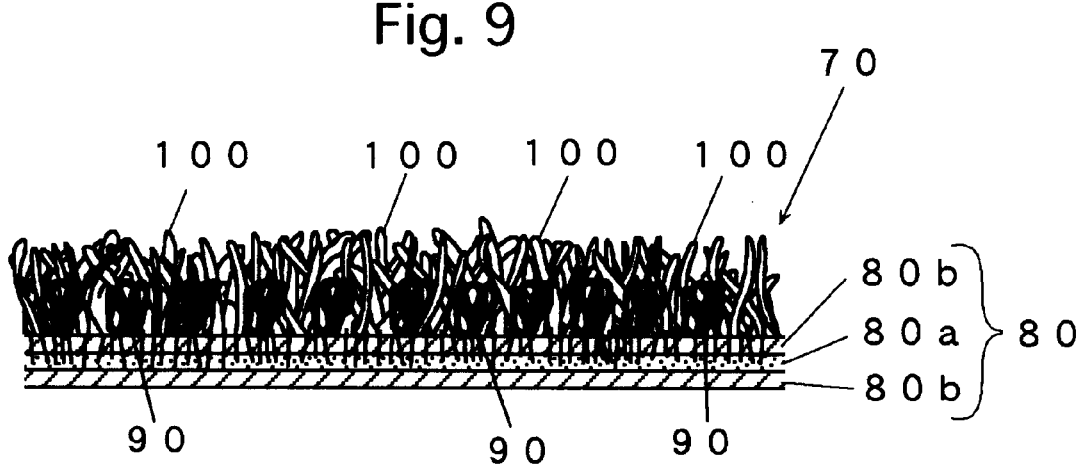
FIG. 9 is a cross section of a semi-artificial turf sheet structure piece shown in FIG. 8.

The semi-artificial turf piece 70 forming the semi-artificial turf 20 is formed of a sheet portion 80, artificial turf portions 90 arranged at the sheet portion 80 and natural turf portions 100, as shown in FIG. 9. The sheet portion 80 is formed of a seed sheet 80a having seeds of a natural turf, and a pair of upper and lower surface sheets 80b located at opposite sides of the seed sheet 80a. The surface sheet 80b is formed of synthetic fiber cotton containing water-absorbing fibers.

The natural turf portion 100 is formed of a turf growing from the seed sheet 80a, and has a height larger than the artificial turf portion 90. The artificial turf portion 90 is formed of the foregoing BCF nylon (more specifically BCF nylon 6), has a loop form and is fixed to one of the surface sheets 80b by urethane adhesive. The surface of the artificial turf portion 90 is covered with the natural turf portion 100.

Accordingly, in the semi-artificial turf piece 70, the loop structures of the artificial turf portion 90 hidden in the natural turf portion 100 form an elastic support member, which prevents falling or tumbling of the natural turf portion 100 and provides an appropriate cushioning property. Even when the natural turf portion 100 is damaged, a new natural turf will appear from a lower side when it grows to some extent, so that the natural turf portion 100 will be naturally restored. Even immediately after the natural turf portion 100 is damaged, the artificial turf portion 90 appears to compensate the damaged appearance.

The natural turf portions 100 of the semi-artificial turfs 20 laid over the wall surfaces 30, 40, 50 and 60 of the concrete dam 10 are grown as follows:

As shown in FIG. 8, a piping 11 for water supply is arranged at the wall surfaces 30, 40, 50 and 60, and opposite ends of the piping 10 are disposed in a reservoir 12 behind the concrete dam 1. The piping 11 is provided with a pump (not shown), which circulates water in the reservoir 12 through the piping 11.

The piping 11 is provided with a plurality of faucets 13, which supply water to the semi-artificial turfs 20, and also supply nutrient such as nitrogen, phosphoric acid and potassium, so that hydroponic culturing of the natural turf portions 100 of the semi-artificial turfs 20 is performed.

The nutrient for growing the natural turf portion is directly supplied in an appropriate manner or is mixed into the water to be supplied.

In this manner, the semi-artificial turfs 20 are laid over the wall surfaces 30, 40, 50 and 60 of the concrete dam 10 for growing the same, whereby the concrete wall surfaces 30, 40, 50 and 60 are covered with the semi-artificial turfs 20 and are not exposed to the direct sunshine, wind and rain, so that it is possible to prevent deterioration of the wall surfaces 30, 40, 50 and 60. Since the wall surfaces 30, 40, 50 and 60 are covered with the green semi-artificial turfs 20, the concrete walls can be greened easily.

Since the semi-artificial turfs 20 are laid over the wall surfaces 30, 40, 50 and 60 of the concrete dam 10 for growing the same, water stored in the dam can be supplied together with nutrient through the piping 11 and faucets 13 to the semi-artificial turfs 20, so that growth of the natural turf portions 100 can be performed easily.

Figure 10:
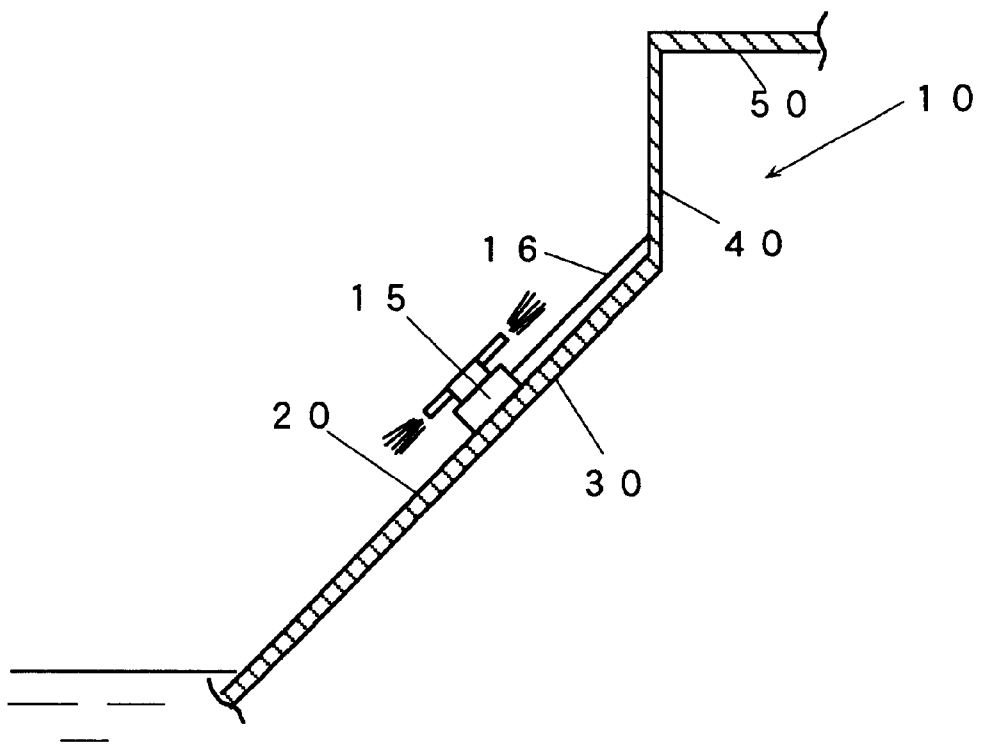
FIG. 10 is a cross section of a major portion of a concrete dam for showing another example of a method of growing a turf according to the invention.

FIG. 10 shows an example, in which water is supplied to the semi-artificial turf 20 laid over the inclined wall surface 30 of the concrete dam 10, and, for this purpose, there is provided a runner or mobile unit 15 which runs on the inclined wall surface 30 and stores water for supplying the water. The runner 15 is, for example, a radio-controlled mobile runner 15 which can move longitudinally and laterally. The runner 15 is supported through a wire 16 by the vertical wall surface 40 to prevent falling from the inclined wall surface 30. The wire 16 is supplied from an unillustrated pulley, and is delivered from or reeled up to the pulley in synchronization with downward or upward movement of the runner 15 along the inclined wall surface 30.

Figure 11:
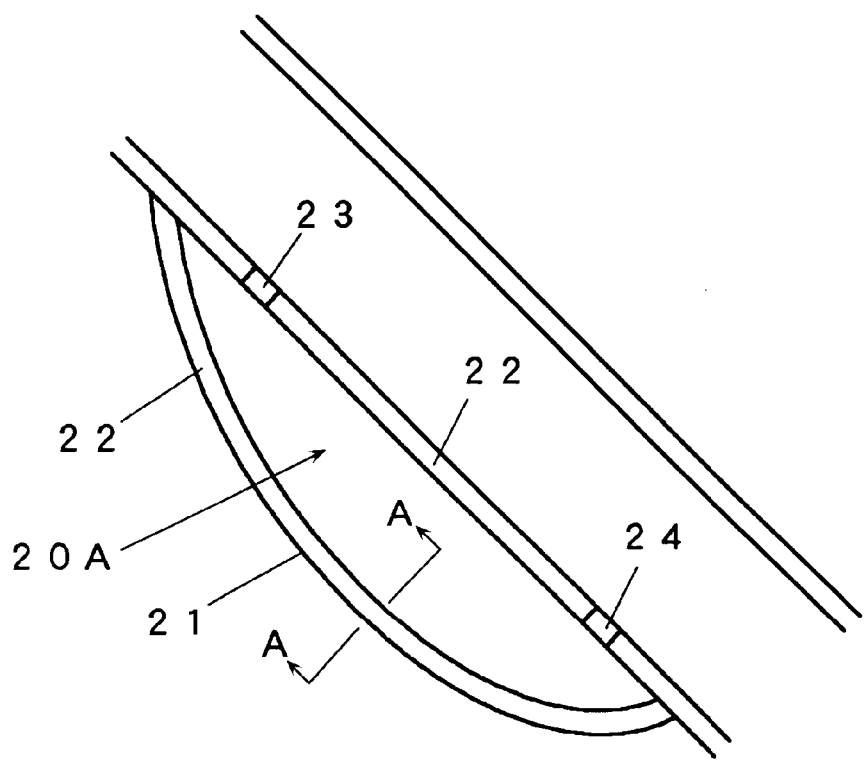
FIG. 11 is a plan showing still another example of a method of growing a turf according to the invention, and specifically showing a retention pond and its surrounding.
Figure 12:
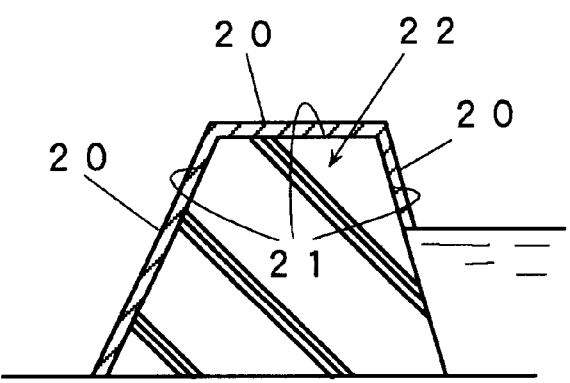
FIG. 12 is a cross section taken along line A-A in FIG. 11.

Then, another embodiment of a method of growing a turf according to the invention will be described below with reference to FIGS. 11 and 12.

In this embodiment, the semi-artificial turfs 20 are grown at a concrete wall surface 21 of a retention pond 20A.

The retention pond 20A, which is provided for temporarily and partially storing flood for lowering a flood level at a downstream position, is surrounded by a bank 22 made of, e.g., concrete. The concrete wall or surface 21 is a surface of the bank 22, and the semi-artificial turf 20 is laid over the wall surface 21 for growing the same. In FIG. 11, a reference number 23 indicates an overflow bank provided at a portion of the bank 22, and a reference number 24 indicates a drain gate.

The semi-artificial turf 20 is grown at the concrete wall surface 21 in a manner similar to that for growing the semi-artificial turf sheet structure at the concrete dam. More specifically, a water supply piping is arranged at the wall surface 21, and water and nutrient are supplied from faucets provided at the piping, or a sprinkler vehicle is periodically used to supply water to them.

In this manner, the semi-artificial turf 20 is laid over the concrete wall surface 21 of the retention pond 20A. For growing the turf, water stored in the retention pond 20A is supplied together with nutrient to the semi-artificial turf 20, so that the natural turf portion 100 of the structure 20 can be grown easily.

If the retention pond 20A and its surroundings are used as a place for recreation, they provide a comfortable place, because the concrete wall surface 21, i.e., the top and opposite side surfaces of the bank 22 are covered with semi-artificial turf 20.

In the method of growing the turf described above, the semi-artificial turf 20 is laid over each of the concrete wall surfaces 30, 40, 50 and 60 of the concrete dam 10 or the concrete wall surface 21 of the retention pond 20A for performing hydroponics. However, the method is not restricted to this, and may be employed for laying the turf over an outer wall (e.g., a balcony or a roof) of a general building for hydroponics.

Then, a method of laying a turf sheet structure according to the invention will be described below with reference to FIGS. 13 to 17. In the embodiment described below, the turf sheet structure is formed of a semi-artificial turf sheet structure which is the substantially same as the semi-artificial turf sheet structure 20 employed in the method of growing the turf at the concrete wall described before. The turf sheet structure in this embodiment is arranged at large-scale facilities, and more specifically at a so-called domed stadium for a baseball, a soccer or the like.

Figure 13:
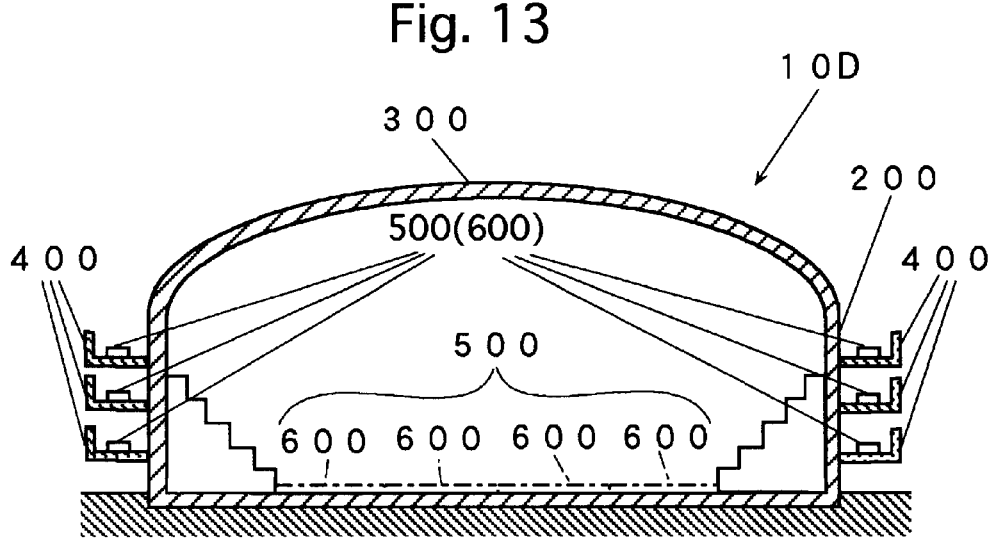
FIG. 13 is a cross section of a domed stadium for showing an example of a method of laying a turf sheet structure of the invention.
Figure 14:
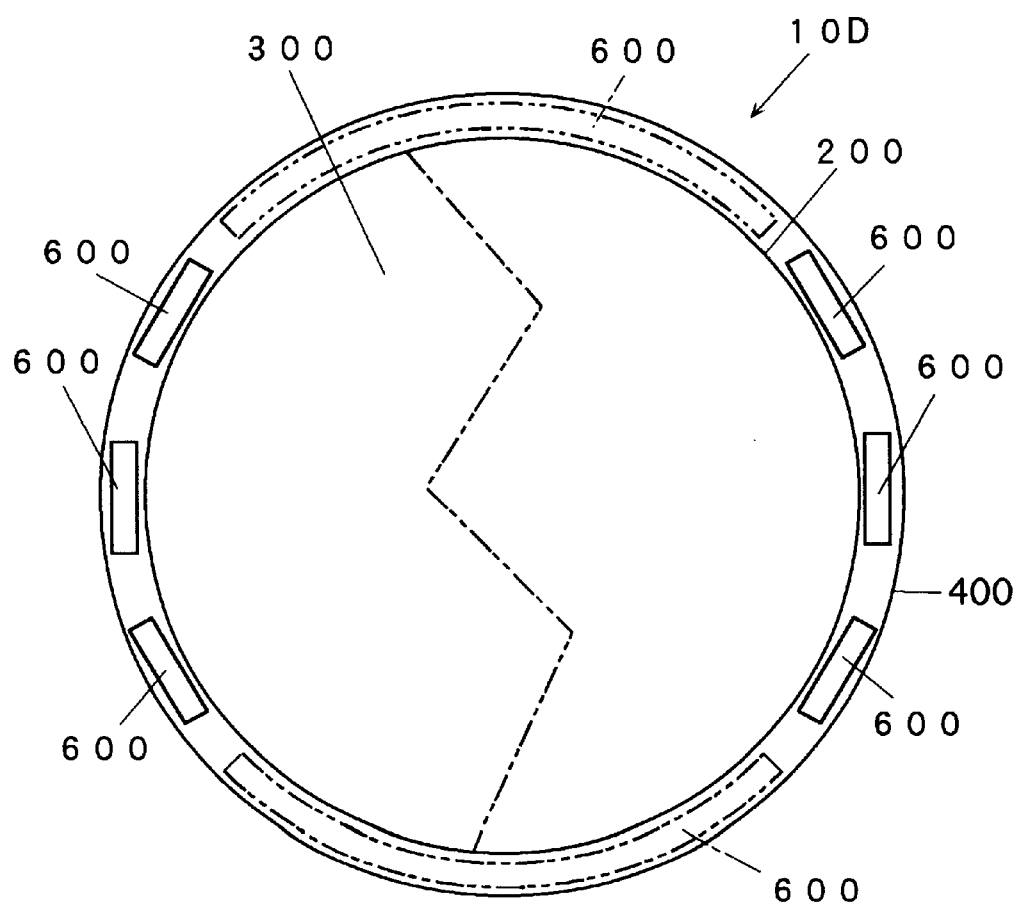
FIG. 14 is a plan of the stadium in FIG. 13.

As shown in FIGS. 13 and 14, a domed stadium 10D is formed of a substantially cylindrical outer wall 200 and a domed roof 300 arranged at the top of the outer wall 200.

The outer wall 200 of the domed stadium is provided with a plurality of balconies (outdoor accommodating places) 400 arranged in a circumferential direction. The balconies 400 have annular forms and are arranged at vertically spaced three levels. These balconies 400 accommodate semi-artificial turf sheet structures 500 which are to be laid in the domed stadium and each of them is formed of a plurality of semi-artificial turf sheet structure pieces 600.

The semi-artificial turf sheet structure piece 600 (which will be referred to as the "semi-artificial turf piece 600" hereafter) is the same as the semi-artificial turf sheet structure piece 70 shown in FIG. 9, and has a width of about 1 m and a length of about 20 m.

Figure 15:
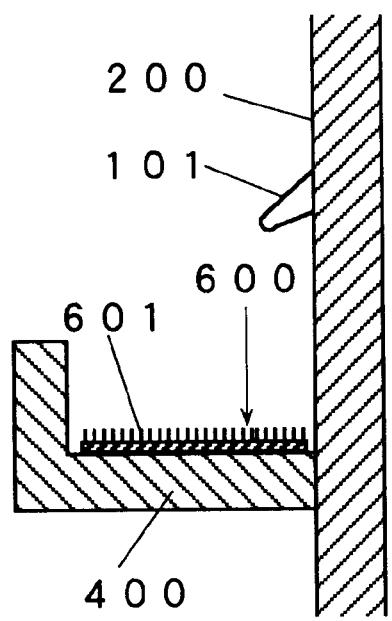
FIG. 15 is a cross section of a balcony portion of the domed stadium in FIG. 13.

The semi-artificial turf pieces 600 are circularly arranged at the balcony 400. Water is supplied from a plurality of nozzles 101 to these semi-artificial turf pieces 600 as shown in FIG. 15. The nozzles 101 are arranged at the outer wall 200 with a circumferential space between each other, and are connected to a water supply pipe (not shown).

The water supplied to the pipe may be service-water or may be rainwater received on the roof 300 of the domed stadium 10D and stored in a tank through gutters, pipings or the like for supplying it, e.g., by a pump.

In this example, a game such as a baseball is not being played at the domed stadium 10D, and it is not necessary to lay the semi-artificial turf sheet structures 500 (which will be referred to as the "semi-artificial turfs 500" hereafter) at the stadium 10D. In this case, a large number of semi-artificial turf pieces 600 forming the semi-artificial turfs 500 are laid at the balconies 400 for storing them, and the natural turfs 601 (see FIG. 15) of the semi-artificial turf piece 600 are grown by hydroponics. This growth is performed in the following manner. Since the balconies 400 are located outdoors, the semi-artificial turf pieces 600 are exposed to natural light as well as natural rainwater and water periodically supplied from nozzles 101. Thereby, water-absorbing surface sheets (which are not shown but correspond to the surface sheet 80b in the semi-artificial turf sheet structure piece 70 shown in FIG. 9) sufficiently retain the water, by which the natural turf portions 601 are grown. The fertilizer (nitrogen, phosphoric acid and potassium) for the natural turf portion is appropriately supplied, or is mixed into the water to be supplied as described above. When semi-artificial turfs 500 are to be laid in the domed stadium 10D, the semi-artificial turf pieces 600 laid in the balconies 400 are transferred to and laid in the domed stadium 10D. In this case, each semi-artificial turf piece 600 is rolled at the balcony 400, and is transferred to an outside of the first floor of the domed stadium 10D, e.g., by a crane. These rolled pieces 600 are successively transferred through the entrance at the first floor. The semi-artificial turf pieces 600 thus transferred are then developed and joined together for laying them in the domed stadium 10D.

When the semi-artificial turfs 500 arranged in the domed stadium 10D are not required any longer, the semi-artificial turf pieces 600 forming the turfs 500 are rolled and removed from the floor. The semi-artificial turf pieces 600 thus rolled are successively transferred to the outside of the domed stadium, and are transferred to the balconies 400, e.g., by a crane. These pieces 600 are successively developed and laid in the balconies 400 for storing them, and the natural turf portions 601 of the semi-artificial turf pieces 600 are grown at the balconies 400 similarly to the foregoing manner.

By employing this manner of laying the semi-artificial turf 500 in the domed stadium 10D, a warehouse for storing the turf sheet structures is not required, and the semi-artificial turf 500 can be easily stored at the large balconies while growing the natural turf portion. Since the semi-artificial turf pieces 600 forming the semi-artificial turf 500 are laid in the balconies 400, the balconies 400 can be greened.

Since the semi-artificial turf 500 is formed of a large number of semi-artificial turf pieces 600, the semi-artificial turf 500 can be stored in a divided and laid manner. Thus, the semi-artificial turf pieces 600 can be laid and stored circularly along the balconies, and transfer of the semi-artificial turf 500 between the interior of the domed stadium 10D and the balconies 400 can be performed easily.

Figure 16:
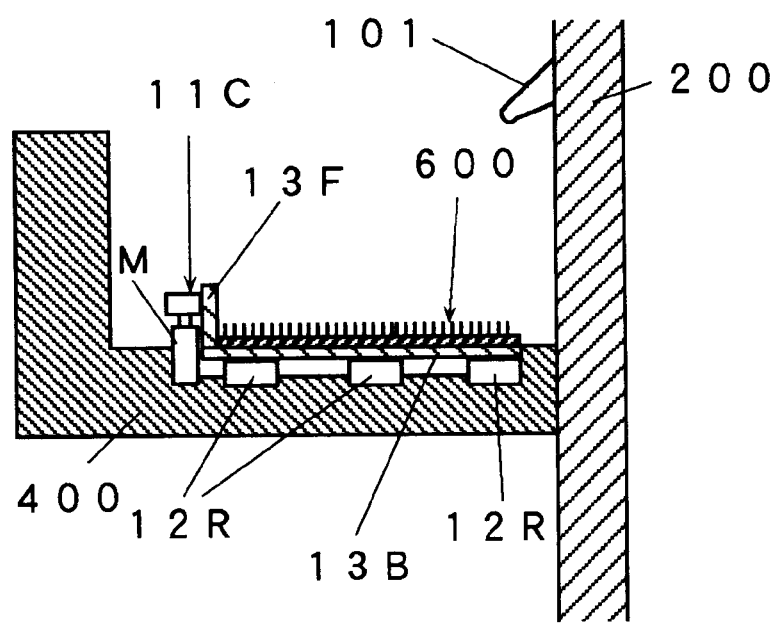
FIG. 16 is a cross section of another example of a balcony portion of the domed stadium in FIG. 13.

FIG. 16 shows a modification of the balcony 400 for laying and storing the semi-artificial turf pieces 600. At the bottom surface of the balcony 400, there is arranged a conveyer system 11C for moving the semi-artificial turf pieces 600 in the circumferential direction of the domed stadium 10D.

The conveyer system 11C is formed of a large number of rollers 12R arranged at the bottom surface of the balcony 400, an annular circulating band 13B carried by the rollers 12R for movement in the circumferential direction of the domed stadium 10D, and a drive motor M which is engaged with a flange 13F formed at the outer periphery of the circulating band 13B for circulating the band 13B in the circumferential direction of the domed stadium 10D. The semi-artificial turf pieces 600 are laid and stored on the circulating band 13B.

The semi-artificial turf pieces 600 laid on the circulating band 13B are moved in the circumferential direction of the domed stadium 10D in accordance with circulation of the circulating band 13B.

As described above, the conveyer system 11C for moving the semi-artificial turf pieces 600 in the circumferential direction of the domed stadium is arranged at the balcony 400. In the operation of growing the natural turf portions of the semi-artificial turf pieces 600 at the balcony 400, therefore, the semi-artificial turf pieces 600 are appropriately circulated to expose them uniformly to the sunshine, so that the natural turf portions can be grown efficiently. Also in the operation of transferring the semi-artificial turf pieces 600 to and from the balcony 400, the semi-artificial turf pieces 600 can be moved, whereby the semi-artificial turf pieces 600 can be transferred through one position to and from the balcony 400, and thus transfer of the semi-artificial turf pieces 600 can be performed easily.

Figure 17:
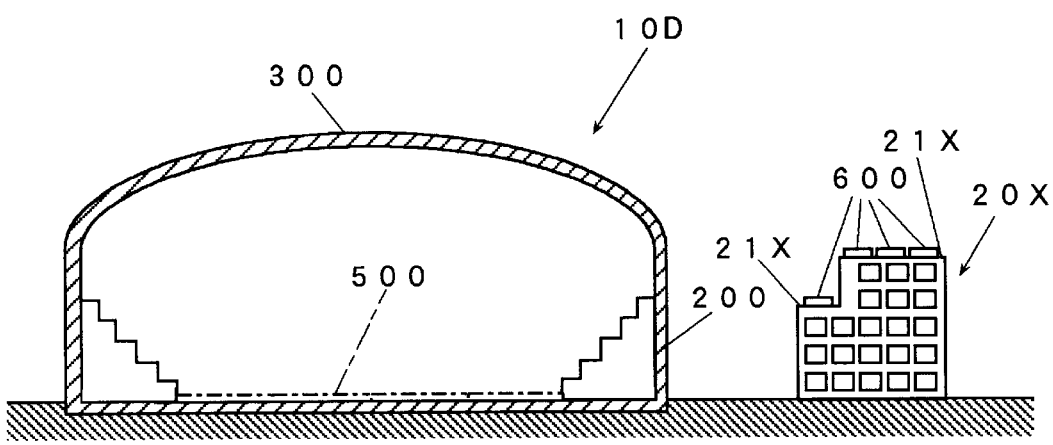
FIG. 17 shows a domed stadium and a neighboring building for showing another example of laying the turf sheet structure of the invention.

Then, description will be given on another embodiment of a method of laying a turf sheet structure according to the invention with reference to FIG. 17.

In this embodiment, a building (outdoor accommodating place) 20X built near the domed stadium 10D has a roof 21X, on which the semi-artificial turf pieces 600 are laid and stored. When the semi-artificial turf 500 is to be laid in the domed stadium 10D, the semi-artificial turf pieces 600 are rolled on the roof 21X of the building 20X. The rolled semi-artificial turf pieces 600 are transferred to the outside of the first floor of the domed stadium, e.g., by a crane, and then the rolled semi-artificial turf pieces 600 are successively transferred through the entrance at the first floor. The semi-artificial turf pieces 600 thus transferred are developed and joined together for laying them in the domed stadium 10D.

As described above, the roof 21X of the building 20X near the domed stadium 10D is utilized as a place for accommodating and growing the semi-artificial turf pieces 600. The building 20X does not have a circular plan shape but has a square plan shape in contrast to the domed stadium 10D. This achieves such an advantage that the semi-artificial turf pieces 600 can be easily arranged without a gap. Since the semi-artificial turf pieces 600 are laid over the roof 21X, the roof 21X is covered with the turf, so that the roof 21X can be effectively used as a place for relaxation. In the case where the natural turf portions of the semi-artificial turf pieces 600 are to be grown at the roof 21X, the growth can be performed similarly to the foregoing embodiment. Thus, the semi-artificial turf pieces 600 are exposed to the natural light. Also, the water can be supplied by rainfall, and the water and fertilizer can be periodically supplied, e.g., from sprinklers arranged at the roof 21X.

In the foregoing embodiment, the semi-artificial turf pieces 600 are accommodated at the balconies 400. Alternatively, the semi-artificial turf pieces 600 may be accommodated for growth at the roof 300 of the domed stadium 10D or a garden for the semi-artificial turf pieces 600 prepared radially outside the domed stadium 10D.

In the later embodiment, the semi-artificial turf pieces 600 are accommodated for growth at the roof 21X of the building 20X. Alternatively, they may be accommodated for growth at another place such as balconies of the building 20x.

INDUSTRIAL APPLICABILITY

The plant growth sheet structure and the natural turf sheet structure of the invention can be applied to a greening project for places to be greened, and a project for arranging the natural turf at places such as various sport facilities, a park and a bank requiring provision of natural turfs. The method of growing the turf of the invention can be employed for protecting and greening various concrete walls and for improving scenery. The method of laying the turf sheet structure of the invention can be applied to a project for laying natural turfs at various facilities, and particularly for laying natural turfs on demand at large-scale facilities such as a large domed stadium.

What is claimed is:

1. A plant growth sheet structure for growing a plant, comprising:
   a core layer and a seed holding layer on top of a base web layer, wherein (a) said core layer
   (1) has structure integrity,
   (2) is gas and water permeable by virtue of gaps provided therein; and
   (3) has a plurality of flexible plant protection projections on the surface thereon, wherein
(b) said base web layer is water retentive, with said core layer, said seed holding layer, and said base web layer being coupled together by the flexible plant protection projections woven through said base web layer to prevent decomposition of the plant growth sheet structure, and wherein
(c) said seed holding layer is formed from a material different than either said core layer or said base web layer by the flexible plant protection projections woven through said base web layer to prevent decomposition of the plant growth sheet structure.

2. The plant growth sheet structure of claim 1, wherein a plurality of said flexible plant protection projections form a turf.

3. The plant growth sheet structure of claim 1, wherein said seed holding layer for holding and germinating plant seeds is situated between said core layer and said base web layer.

4. The plant growth sheet structure of claim 3, wherein a plurality of said flexible plant protection projections form a turf.

5. The plant growth sheet structure of claim 3, wherein said plant seeds are grass seeds.

6. A plant growth sheet structure for growing a plant, comprising the following layers in ascending order:
   (1) a base web layer which is water retentive;
   (2) a core layer having structural integrity which is gas and water permeable by virtues of gaps provided therein;
   (3) a plant seed holding layer for holding and germinating plant seeds;
   (4) a cover web layer for allowing growth of plants from said plant seeds therethrough with the surface of said cover web layer having flexible plant protection projections thereon;
   wherein the layers (1)–(4) are coupled together by the flexible plant protection projections woven through said base web layer, core layer, plant seed holding layer and cover web layer to prevent decomposition of the plant growth sheet structure, and wherein said plant seed holding layer is formed from a material different than said base web layer or said core layer by the flexible plant protection projections woven through said base web layer, core layer, plant seed holding layer and cover web layer to prevent decomposition of the plant growth sheet structure.

7. The plant growth sheet structure of claim 6, wherein said plant is a turf.

8. The plant growth sheet structure of claim 6, wherein said plant seeds are grass seeds.

9. The plant growth sheet structure of claim 6, wherein said plant protection projections comprise fiber members woven through said cover web layer into said base web layer.

10. The plant growth sheet structure of claim 9, wherein said fiber members have a water transferring property.

11. The plant growth sheet structure of claim 9, wherein said fiber members are pile yarns, and said plant protection projections are pile or pile-like projections.

12. The plant growth sheet structure according to claim 9, further comprising a backing member which at least partially prevents the disengagement of portions of said fiber members forming said plant protection projections woven into said base web layer.

13. The plant growth sheet structure of claim 6, wherein said core layer is a mesh core layer.

14. The plant growth sheet structure of claim 6, wherein said base web layer is a cotton layer comprising water-absorbing cotton.

15. The plant growth sheet structure according to claim 9, wherein said fiber members are pile yarns; said plant protection projections are pile or pile-like projections; said core layer is a mesh core layer; said base web layer comprises water-absorbing cotton.

16. The plant growth sheet structure of claim 9, wherein said plant seed holding layer comprises
   (a) a non-woven fabric sheet allowing germination and subsequent growth of the plant seeds which are uniformly dispersed on said non-woven fabric sheet; and
   (b) a water-soluble seed retaining film covering said plant seeds without preventing the germination and subsequent growth of said plant seeds.

17. The plant growth sheet structure of claim 9, wherein said structure is flexible allowing rolling thereof.

18. The plant growth sheet structure of claim 9, wherein said plant seed holding layer holds grass seeds.

19. A turf growing method, comprising the following steps:
   (1) laying a semi-artificial turf sheet structure, which comprises:
      a plant growth sheet structure for growing a plant, comprising:
         a core layer and a seed holding layer on top of a base web layer, wherein said core layer has structure integrity, is gas and water permeable by virtue of gaps provided therein; and has a plurality of flexible plant protection projections on the surface thereon, wherein said base web layer is water retentive, with said core layer said seed holding layer and said base web layer being coupled together by the flexible plant protection projections woven through said base web layer to prevent decomposition of the plant growth sheet structure, and said seed holding layer is formed from a material different than either said core layer or said base web layer, on a concrete wall surface and thereafter
   (2) supplying water optionally containing nutrients to said semi-artificial turf sheet structure.

20. The turf growing method of claim 19, wherein said concrete wall surface is a concrete wall surface of a concrete dam.

21. The turf growing method of claim 19, wherein said concrete wall surface is a concrete wall surface of a retention pond.

22. A turf growing method of claim 19, wherein said semi-artificial turf sheet structure comprises a plurality of plant growth sheet structures, which plant growth sheet structure comprises the following layers in ascending order
   (1) a base web layer which water retentive;
   (2) a plant seed holding layer for holding and germinating plant seeds; and
   (3) a core layer, which is gas and water permeable by virtue of gaps provided therein, having structural integrity, wherein said core layer has flexible plant protection projections on the surface thereon;
with the layers (1)–(3) coupled together by the flexible plant protection projections woven through said base web layer, core layer and plant seed holding layer to prevent decompositon of the plant growth sheet structure, wherein said core layer optionally has turfs growing on the surface.

23. A turf growing method of claim 19, wherein said semi-artificial turf sheet structure comprises a plurality of plant growth sheet structures, which plant growth sheet structure comprises the following layers in ascending order:
(1) a base web layer is water retentive;
(2) a core layer, which is gas and water permeable by virtue of gaps provided therein, having structural integrity;
(3) a plant seed holding layer for holding and germinating plant seeds; and
(4) a cover web layer allowing growth of plants from said plant seeds therethrough, wherein said cover web layer have flexible plant protection projections on the surface thereof;

with the layers (1)–(4) coupled together by the flexible plant protection projections woven through said base web layer, core layer, plant seed holding layer and cover web layer to prevent decompositon of the plant growth sheet structure, wherein said cover web layer optionally has turfs growing on the surface.

24. A method of utilizing turf sheet structure in large-scale facilities said turf sheet capable of repeated installation and removal from the large-scale facilities, said method, comprising the following steps:
(a) laying a semi-artificial turf sheet structure at an outdoor accommodating place located outside said large-scale facilities, which semi-artificial turf sheet structure comprises an artificial turf portion and a natural turf portion having a growing turf;
(b) maintaining said semi-artificial turf sheet structure at said outdoor accommodating place;
(c) transferring said semi-artificial turf sheet structure to said large-scale facilities on demand by laying said semi-artificial turf sheet structure on said large-scale facilities; and thereafter
(d) transferring said semi-artificial turf sheet structure from said large-scale facilities to an accommodating place outside said large-scale facilities and, thereafter, laying said semi-artificial turf sheet structure on said accommodating place.

25. A method of removing a semi-artificial turf sheet structure from large-scale facilities and maintaining the semi-artificial turf sheet structure removed, which semi-artificial turf sheet structure comprises an artificial turf portion and a natural turf portion having a growing turf said method comprising:
transferring said semi-artificial turf sheet structure from said large-scale facilities to an accommodating place outside said large-scale facilities and, thereafter, laying said semi-artificial turf sheet structure on said accommodating place; and
returning said semi-artificial turf sheet structure to said large-scale facilities on demand by laying said semi-artificial turf sheet structure on said large-scale facilities.

26. The method of claim 24, wherein said large-scale facilities are sport facilities or gymnasium.

27. The method of claim 25, wherein said large-scale facilities are sport facilities.

28. The method of laying turf sheet structure of claim 24, wherein said semi-artificial turf sheet structure comprises a plurality of semi-artificial turf sheet pieces.

29. The method of laying turf sheet structure of claim 24, wherein said outdoor accommodating place is an outer wall and/or a roof of said large-scale facilities.

30. The method of laying the turf sheet structure of claim 24, wherein said outdoor accommodating place is an outer wall and/or a roof of a building neighboring to said large-scale facilities.

31. The method of laying the turf sheet structure of claim 24, wherein said semi-artificial turf sheet structure comprises a plurality of plant growth sheet structures, each of which comprises the following layers in ascending order
(1) a base web layer which is water retentive;
(2) a plant seed holding layer for holding and germinating plant seeds; and
(3) a core layer which is gas and water permeable by virtue of gaps therethrough having structural integrity, wherein said base web has flexible plant protection projections on the surface thereof;

with the layers (1)–(3) coupled together by the flexible plant protection projections woven through said base web layer, core layer and plant seed holding layer to prevent decomposition of the plant growth sheet structure, wherein said core layer optionally has a turf growing on the surface.

32. The method of laying the turf sheet structure of claim 24, wherein said semi-artificial turf sheet structure comprises a plurality of plant growth sheet structures, each of which comprises the following layers in ascending order
(1) a base web layer which is water retentive;
(2) a core layer, which is gas and water permeable by virtue of gaps provided therein, having structural integrity;
(3) a plant seed holding layer for holding and germinating plant seeds; and
(4) a cover web layer allowing growth of plants from said plant seeds therethrough, which cover web layer has flexible plant protection projections on the surface thereof with layers (1)–(4) are integrally coupled together by the flexible plant protection projections woven through said base web layer, core layer, plant seed holding layer and cover web layer to prevent decomposition of the plant growth sheet structure, wherein said cover web layer optionally has a turf growing on the surface.

33. The method of claim 24, wherein said large-scale facilities are golf courses.

34. The method of claim 25, wherein said large-scale facilities are gymnasiums.

* * * * *